(12) United States Patent
Sato et al.

(10) Patent No.: US 11,024,129 B2
(45) Date of Patent: Jun. 1, 2021

(54) CONTROL PROGRAM, CONTROL METHOD, AND COMPUTER

(71) Applicant: GREE, Inc., Tokyo (JP)

(72) Inventors: Daiki Sato, Tokyo (JP); Yuta Amano, Tokyo (JP)

(73) Assignee: GREE, Inc., Tokyo (JP)

( * ) Notice: Subject to any disclaimer, the term of this patent is extended or adjusted under 35 U.S.C. 154(b) by 276 days.

(21) Appl. No.: 16/048,609

(22) Filed: Jul. 30, 2018

(65) Prior Publication Data

US 2019/0035226 A1 Jan. 31, 2019

(30) Foreign Application Priority Data

Jul. 31, 2017 (JP) .............................. JP2017-148459

(51) Int. Cl.
*A63F 13/69* (2014.01)
*G07F 17/32* (2006.01)

(52) U.S. Cl.
CPC .......... *G07F 17/3293* (2013.01); *A63F 13/69* (2014.09); *G07F 17/3262* (2013.01)

(58) Field of Classification Search
None
See application file for complete search history.

(56) References Cited

U.S. PATENT DOCUMENTS

| | | | | |
|---|---|---|---|---|
| 2013/0196732 A1* | 8/2013 | Oochi | .................... | A63F 13/822 463/17 |
| 2014/0128164 A1* | 5/2014 | Ukai | ........................ | A63F 13/58 463/42 |
| 2016/0051896 A1* | 2/2016 | Hakuta | .................... | A63F 13/35 463/42 |

FOREIGN PATENT DOCUMENTS

| | | |
|---|---|---|
| JP | 2016-067910 A | 5/2016 |
| JP | 2016-112416 A | 6/2016 |
| JP | 2016-203010 A | 12/2016 |
| JP | 2017-55790 A | 3/2017 |

OTHER PUBLICATIONS

Japanese Pre-Appeal Reconsideration Report dated Sep. 11, 2018 of corresponding Application No. JP2017-148459; 8 pgs.
Office Action dated Jan. 8, 2019 in corresponding Japanese Application No. 2017-148459; 10 pages.
Office Action dated Dec. 12, 2017 of corresponding Japanese Application No. 2017-148459; 7 pgs.

* cited by examiner

*Primary Examiner* — Jay Trent Liddle
*Assistant Examiner* — Alex F. R. P. Rada, II
(74) *Attorney, Agent, or Firm* — Maier & Maier, PLLC

(57) ABSTRACT

A control program for a game, which may cause a computer to execute: selecting a predetermined number of first items of game content from first items of game content stored in a storage unit, according to a selection instruction provided by a predetermined selection method from a selecting player that is included in a group; storing the selected predetermined number of first items of game content in the storage unit, as a possession target of the selecting player; adding a counter associated with the selecting player, and adding an additional point value to a point associated with the group; and storing a second game content according to the counter associated with each of the players in the storage unit, in association with each of the players, with respect to each of the plurality of players included in the group, in a case where the point value reaches a predetermined value.

19 Claims, 12 Drawing Sheets

GAME CONTENT TABLE T1

| GAME CONTENT ID | NAME | IMAGE | DEGREE OF RARITY | LEVEL | HP | ATTACK POWER | DEFENSE POWER | ATTRIBUTE | ... |
|---|---|---|---|---|---|---|---|---|---|
| C0001 | ×× | 0001.png | SS | 21 | 500 | 100 | 100 | THUNDER | ... |
| C0002 | ++ | 0002.png | SR | 15 | 450 | 80 | 120 | FIRE | ... |
| ... | | | | | | | | | |

FIG. 7(a)

EVENT TABLE T2

| EVENT ID | EVENT PERIOD | LOTTERY TARGET | REWARD TARGET (ACCUMULATED LEVEL, GAME CONTENT ID) | ... |
|---|---|---|---|---|
| EV001 | 20161221-00:00~ 20161221-23:59 | C0001, 0020, ... | (1,C0101),(2,C0102), ... | ... |
| ... | | | ... | |

FIG. 7(b)

PLAYER TABLE T3

| PLAYER ID | NAME | POSSESSED GAME CONTENT (POSSESSED ID, GAME CONTENT ID) | COUNTER INFORMATION (COUNTER, EVENT ID) | SECOND GAME CONTENT INFORMATION (GAME CONTENT ID, EVENT ID) | ... |
|---|---|---|---|---|---|
| p0000001 | ○○○○ | (H001, C0001), (H002, C0021), (H003, C0035), ... | (10, EV001), ... | (C0102, EV001), ... | ... |
| p0000002 | △△△△ | (H001, C0002), (H002, C0005), (H003, C0020), ... | (30, EV001), ... | (C0315, EV010), ... | ... |
| ... | ... | ... | ... | ... | ... |

FIG. 8(a)

GROUP TABLE T4

| GROUP ID | ATTENDING PLAYER | POINT INFORMATION (POINT, EVENT ID) | ... |
|---|---|---|---|
| G0001 | p0000001, p0000002, ... | (3000, EV001), ... | ... |
| G0002 | p0000101, p0000102, ... | (2100, EV002), ... | ... |
| ... | ... | ... | ... |

FIG. 8(b)

CONTROL PROGRAM, CONTROL METHOD, AND COMPUTER

FIELD

The present invention relates to a control program, a control method, and a computer.

BACKGROUND

In the related art, there has been known a game device providing a lottery game in which an item of game content such as a game card is randomly selected based on the actions of a player, and the selected game content is provided to the player.

For example, in Patent Literature 1, a game system is disclosed in which a plurality of players are capable of participating in a lottery game. The game system includes a game device of each of the players, and a server managing the progress of the lottery game. Each of the players manipulates the game device, and thus, the lottery game distributed from the server is capable of progressing. In addition, the game device of each of the players is capable of displaying an execution screen of the lottery game executed in the game device of the other player, according to a manipulation of the other player. Accordingly, the player is capable of enjoying lottery processing with a plurality of users by sharing the lottery processing.

Patent Literature 1, referenced above, is Japanese Patent Application JP-A-2017-55790.

SUMMARY

However, in the game system of the related art, the player is only capable of confirming a progress situation of the lottery game of the other player, and thus, is not capable of performing the lottery game in cooperation with the other player. For this reason, in the game system of the related art, it is difficult to improve the motivation of the player for actively participating in the lottery game.

According to various exemplary embodiments, a control program, a control method, and a computer may be provided, which are capable of increasing the number of participating players by improving the motivation of a plurality of players for participating in a game.

A control program according to an exemplary embodiment may be a control program of a computer including a storage unit, which may allow the computer to execute: storing a first game content, a second game content different from the first game content, a point value associated with a group including a plurality of players, and a counter associated with each of the plurality of players in the storage unit; selecting a predetermined number of first game media from the first game media stored in the storage unit, according to a selection instruction from the player included in the group (a selecting player), by a predetermined selection method; storing the selected predetermined number of first game media in the storage unit, as a possession target of the selecting player; adding the counter associated with the selecting player, and adding an additional point value to the point value associated with the group; and storing the second game content according to the counter associated with each of the players in the storage unit, in association with each of the players, with respect to each of the plurality of players included in the group, in a case where the point value reaches a predetermined value.

In addition, in the control program according to an exemplary embodiment, it may be preferable that in storing the second game content in association with each of the players, the second game content according to the counter associated with each of the players may be selected from a plurality of second game media, and the selected second game content may be stored in the storage unit, in association with each of the players.

In addition, in the control program according to an exemplary embodiment, it may be preferable that only in a case where the point value reaches the predetermined value, the second game content may be stored in the storage unit, in association with each of the players.

In addition, in the control program according to an exemplary embodiment, it may be preferable that in a case where the point value does not reach the predetermined value, only the first game content may be stored in the storage unit, in association with each of the players.

In addition, in the control program according to an exemplary embodiment, it may be preferable that the additional point value may be a value which may be randomly selected within a predetermined numerical range.

In addition, in the control program according to an exemplary embodiment, it may be preferable that information relevant to the point associated with the group, and information relevant to the counter associated with the player are displayed.

In addition, in the control program according to an exemplary embodiment, it may be preferable that the second game content associated with each of the players has a high value as the counter increases.

In addition, in the control program according to an exemplary embodiment, it may be preferable that the selection instruction may be receivable until a predetermined game period is ended, even in a case where the point value reaches the predetermined value before the predetermined game period is ended, while steps of processing the storing of the predetermined number of first items of game content selected according to the selection instruction in the storage unit (as the possession target of the player) and processing the adding of the counter associated with the selecting player are continued. When the predetermined game period is ended, the second game content according to the counter associated with each of the players may be stored in the storage unit, in association with each of the players, with respect to each of the plurality of players included in the group.

A control method according to an exemplary embodiment may be a control method of a computer including a storage unit, and the method may include: storing a first game content, a second game content different from the first game content, a point value associated with a group including a plurality of players, and a counter associated with each of the plurality of players in the storage unit; selecting a predetermined number of first items of game content from the first items of game content stored in the storage unit, according to a selection instruction from the player included in the group, by a predetermined selection method; storing the selected predetermined number of first items of game content in the storage unit, as a possession target of the selecting player; adding the counter associated with the selecting player, and adding an additional point value to the point value associated with the group; and storing the second game content according to the counter associated with each of the players in the storage unit, in association with each of the players, with respect to each of the plurality of players included in the group, in a case where the point value reaches a predetermined value.

A computer according to an exemplary embodiment, may include: a storage unit storing a first game content, a second game content different from the first game content, a point value associated with a group including a plurality of players, and a counter associated with each of the plurality of players; a selection unit selecting a predetermined number of first items of game content from the first items of game content stored in the storage unit, according to a selection instruction from the player included in the group, by a predetermined selection method, and storing the selected predetermined number of first items of game content in the storage unit, as a possession target of the selecting player; an addition unit adding the counter associated with the selecting player, and adding an additional point value to the point value associated with the group; and a content processing unit storing the second game content according to the counter associated with each of the players in the storage unit, in association with each of the players, with respect to each of the plurality of players included in the group, in a case where the point value reaches a predetermined value.

According to a control program, a control method, and a computer according to an exemplary embodiment, it may be possible to increase the number of participating players by improving the motivation of a plurality of players for participating in a game.

BRIEF DESCRIPTION OF THE DRAWINGS

FIG. 4(*b*) is another diagram illustrating an exemplary embodiment of a screen to be displayed on a display unit 24 of the mobile terminal 2;

FIG. 4(*c*) is another diagram illustrating an exemplary embodiment of a screen to be displayed on a display unit 24 of the mobile terminal 2;

FIG. 4(*d*) is another diagram illustrating an exemplary embodiment of a screen to be displayed on a display unit 24 of the mobile terminal 2;

FIG. 5(*b*) is another diagram illustrating an exemplary embodiment of the screen to be displayed on the display unit 24 of the mobile terminal 2;

FIG. 5(*c*) is another diagram illustrating an exemplary embodiment of the screen to be displayed on the display unit 24 of the mobile terminal 2;

FIG. 7(*a*) is a diagram illustrating an exemplary embodiment of a data structure of various tables;

FIG. 7(*b*) may be another diagram illustrating an exemplary embodiment of a data structure of various tables;

FIG. 8(*a*) is a diagram illustrating an exemplary embodiment of the data structure of the various tables;

FIG. 8(*b*) may be another diagram illustrating an exemplary embodiment of the data structure of the various tables;

DETAILED DESCRIPTION

Hereinafter, various embodiments of the invention will be described with reference to the drawings. Here, it should be noted that the technical scope of the invention is not limited to the embodiments, and extends to the invention described in the claims and equivalents thereof.

Figure 1:
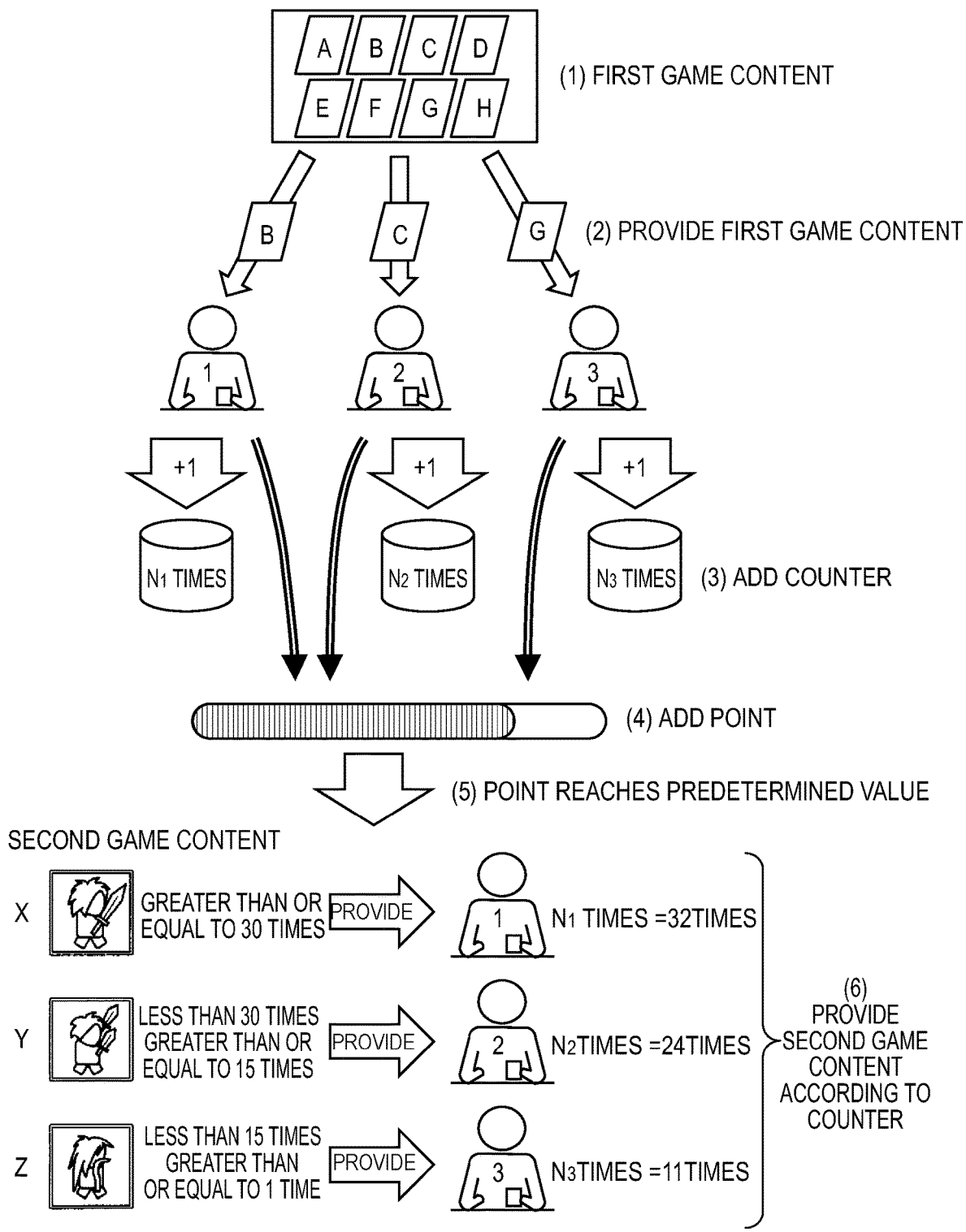
FIG. 1 is a schematic diagram for illustrating an exemplary embodiment of a game to be provided by a game device.

FIG. 1 is a diagram for illustrating an exemplary embodiment of a game to be provided by a game system. The game system may include a mobile terminal possessed by a player, and a server communicating with the mobile terminal possessed by the player. Furthermore, the server may be an example of a computer.

Hereinafter, an example of a lottery game to be provided by the game system of this embodiment will be described with reference to FIG. 1.

In this embodiment, the server may store a plurality of items of game content. The game content may be electronic data which may be used for a game, and may be a card, a character, or an avatar. The game content, for example, may be an item, one or more points, a virtual currency, a ticket, a parameter, or the like. In addition, the game content may be a parameter such as performance information such as level information, status information, a physical power value, and attack power, skill, and ability, and the game content may be a spell, a job, and the like. The game content may be any data insofar as being electronic data which can be acquired, retained, used, managed, exchanged, integrated, reinforced, sold out, disposed, and/or donated by the player in the game. In addition, a utilization mode of a game content may not be limited to that described herein.

The server may store a plurality of first items of game content of the plurality of items of game content, as a selection target in the lottery game ((1) of FIG. 1). The plurality of first items of game content are items of game content different from each other. In addition, a part of all of the plurality of first items of game content may be the same game content.

The server may store a plurality of second items of game content of the plurality of items of game content, as a reward target in the lottery game. The second game content may be an item of game content different from the first game content. Furthermore, the second game content may be identical to the first game content.

The game system provides a lottery game which may be different from a lottery game using the plurality of first items of game content as the selection target. Hereinafter, the lottery game using the plurality of first items of game content as the selection target, will be referred to as a special lottery game. In addition, the lottery game different from the special lottery game, will be referred to as a usual lottery game. Furthermore, when the usual lottery game and the special lottery game are executed according to a selection instruction of the player, the game system may request a consideration such as a virtual currency or a parameter in the game, from the player. In this case, for example, the server performs processing of decreasing the virtual currency or the parameter in the game, which may be associated with the player, at a predetermined timing such as when the selection instruction of the player is received by the server or when the game content is selected.

The server selects a predetermined number of first items of game content from the plurality of first items of game content, according to the selection instruction input by the manipulation of the mobile terminal of the player, and may store the selected predetermined number of first items of game content, as a possession target of the selecting player ((2) of FIG. 1). The server receives the selection instruction within an event period set in advance. Furthermore, the event period may be an example of a game period.

The selection instruction, for example, may be an execution instruction of the special lottery game. In addition, the selection instruction may be a purchase instruction or the like for the player to purchase the game content such as an item, in the game provided by the server. In addition, the selection instruction may be an execution instruction of an event or a match game to be performed in the game provided by the server, and in this case, the player acquires the predetermined number of first items of game content in a case where the event or the match game is completed. At this time, the server may store the selected predetermined number of first items of game content as a possession of the player, in association with identification information of the player or terminal information of the mobile terminal of the player. In addition, the server may store association between the selecting player and the selected predetermined number of first items of game content, without storing the selected predetermined number of first items of game content as the possession target of the selecting player. For example, the server may simply associate only identification information for identifying the first game content, without associating the selected predetermined number of first items of game content with the player as a possessed game content in a player table T3 described below. In addition, when the event is ended, or when a predetermined time has elapsed after the association, the association between the player and the first game content may be deleted.

A method of selecting the predetermined number of first items of game content, may be a random lottery method of randomly extracting a predetermined number of first items of game content from the plurality of first items of game content. Furthermore, the method of selecting the predetermined number of first items of game content, may be a method of extracting a predetermined number of first items of game content from the plurality of first items of game content, according to a predetermined order. In this case, the predetermined sequence may be a sequence of the identification information of the first game content, a sequence of a parameter (for example, a level, attack power, or the like) of the first game content, a sequence of storing the first game content, a predetermined sequence of randomly rearranging the stored first game content, or the like.

As illustrated in the example of FIG. 1, the server may store one first game content B from a plurality of first items of game content A to H, as an acquisition target of a player 1. In addition, the server may store one first game content C from the plurality of first items of game content A to H, as an acquisition target of a player 2. In addition, the server may store one first game content G from the plurality of first items of game content A to H, as an acquisition target of a player 3.

In a case where the first game content is stored as the possession target of the selecting player, the server may add a predetermined number (for example "1") to a counter associated with the player, and may store the added counter ((3) of FIG. 1). Accordingly, the counter may increase whenever the player performs the selection instruction.

The server may store a group including a plurality of players participating in the game. The group may be a group created by the player, or may be a user participating in the event such as the special lottery game, or all users capable of participating in the game. The user capable of participating in the game may be a user installing the game in the mobile terminal 2, all users user-registered in the game, or the like. In addition, the group may be a group determined by a server or an operation side, or may be a group including only a player associated with a predetermined game content, that is, the group may include the plurality of players. As illustrated in the example of FIG. 1, the player 1, the player 2, and the player 3 may constitute one group. In addition, the server may store the point value associated with the group.

In a case where the first game content is stored as the possession target of the player according to the selection instruction from the player belonging to the group, the server may add an additional point value to the point value associated with the group ((4) of FIG. 1). The additional point value may be a value randomly determined by the server. In addition, the additional point value may be a fixed value set in advance, and a value which changes according to the number of times of addition processing of the point.

In a case where the point value reaches a point setting value set in advance ((5) of FIG. 1), the server may store the second game content associated with the player belonging to the group associated with the point value which has reached the point setting value. Furthermore, the point setting value may be an example of a predetermined value. The second game content may be associated with the player, and thus, the second game content may be provided to the player. The second game content associated with the player, may be selected from the plurality of second items of game content, according to the counter associated with the player ((6) of FIG. 1).

As illustrated in the example of FIG. 1, in a case where the counter associated with the player may be greater than or equal to "30", a second game content X may be associated with the player. In addition, in a case where the counter associated with the player is greater than or equal to "15" and less than "30", a second game content Y may be associated with the player. In addition, in a case where the counter associated with the player is greater than or equal to "1" and less than "15", a second game content Z may be associated with the player. Thus, each of the plurality of second items of game content may be associated in a predetermined numerical range according to the counter.

The second game content X, the second game content Y, and the second game content Z are items of game content different from each other. For example, the second game content X may be set such that a value in the game to be provided by the server may be higher than that of the second game content Y and the second game content Z. In addition, the second game content Y may be set such that a value in the game to be provided by the server may be higher than that of the second game content Z.

An item of game content having a high value, for example, may be an item of game content which has a high value of a predetermined parameter of attack power, defense power, or the like of the game content, an efficacy value of a skill, or the like, and may be capable of allowing a match game to advantageously progress, in a case where the game content may be used in the match game. In this case, the predetermined parameter, the efficacy value, or the like of the second game content X may be greater than that of the second game content Y and the second game content Z. In addition, for example, the game content having a high value may be an item of game content in which an exchangeable virtual currency may be expensive, in a case where the game content can be exchanged for a virtual currency to be used in the game. In this case, the second game content X may be set to be more expensive than the second game content Y and the second game content Z.

As described above with reference to FIG. 1, in the game system of this embodiment, each of the plurality of players may execute the game in a manner whereby the first game content is the possession target, and each of the players acquires the second game content according to a contribution ratio of the game of each of the players (for example, the number of times of execution or the like). In a case where the point value is set to increase whenever the game is executed by each of the plurality of players, and reaches the point value setting value, each of the players may acquire the second game content according to the contribution ratio of the game of each of the players. According to such a game system, not only is does the game provide using the first game content as the possession target, but the plurality of players may also execute the game in cooperation, and thus, the plurality of players are capable of acquiring the second game content. Thus, in the game system, the motivation of the plurality of players for participating in the game may be improved, and thus, it may be possible to increase the number of participating players participating in the game. In other words, it may be possible to improve a participating rate of each of the players with respect to the game.

Furthermore, the above description of FIG. 1 may merely be the description for deeper understanding for the contents of the invention. Specifically, the invention may be carried out in each of the embodiments described below, and may be carried out by various modification examples without substantially departing from the principle of the invention. All of the modification examples are included within the scope disclosed in the invention and herein.

Figure 2:
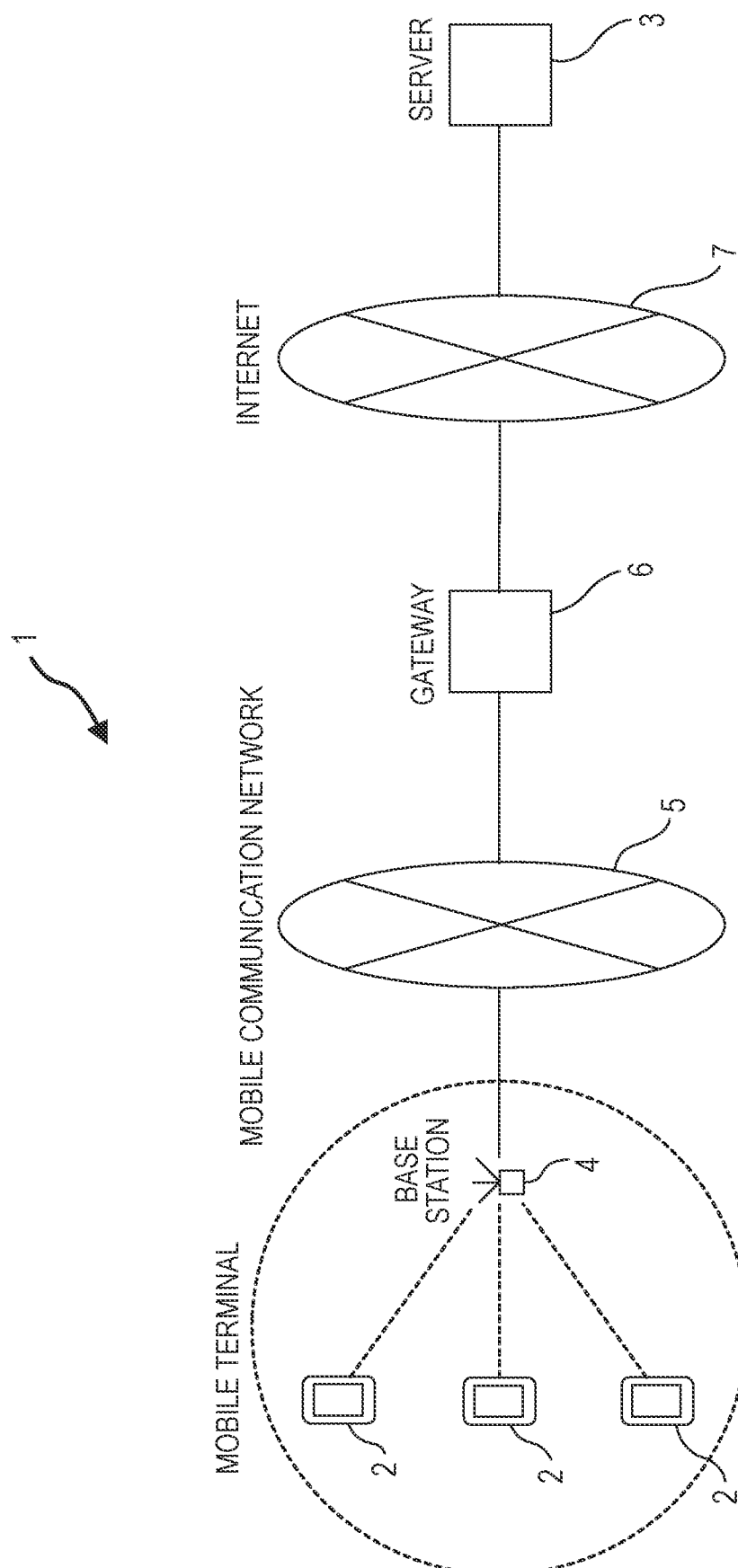
FIG. 2 is a diagram illustrating an exemplary embodiment of a schematic configuration of a game system 1.

FIG. 2 may be a diagram illustrating an example of a schematic configuration of the game system 1.

The game system 1 may include a plurality of mobile terminals 2 manipulated by each of the plurality of players, and a server 3. The mobile terminal 2 and the server 3, for example, may be connected to each other through a communication network such as a base station 4, a mobile communication network 5, a gateway 6, and the internet 7. Communication may be performed between the mobile terminal and the server 3, on the basis of a predetermined communication protocol. The predetermined communication protocol, for example, may be a hypertext transfer protocol (HTTP) and the like. Furthermore, the mobile terminal 2 may be an example of the game device providing the game, but the game device may not be limited to the mobile terminal 2. For example, the server 3 may be used as the game device. In addition, the game system 1 including the mobile terminal 2 and the server 3, may be used as the game device.

The mobile terminal 2, may be for example, a multi-functional mobile telephone (a so-called "smart phone"). Furthermore, the mobile terminal 2, for example, may be a mobile telephone (a so-called "feature phone"), a personal digital assistant (PDA), a tablet terminal, a tablet personal computer (PC), or the like. In addition, the mobile terminal 2 may be a mobile game machine, a mobile music player, notebook PC, or the like.

Figure 3:
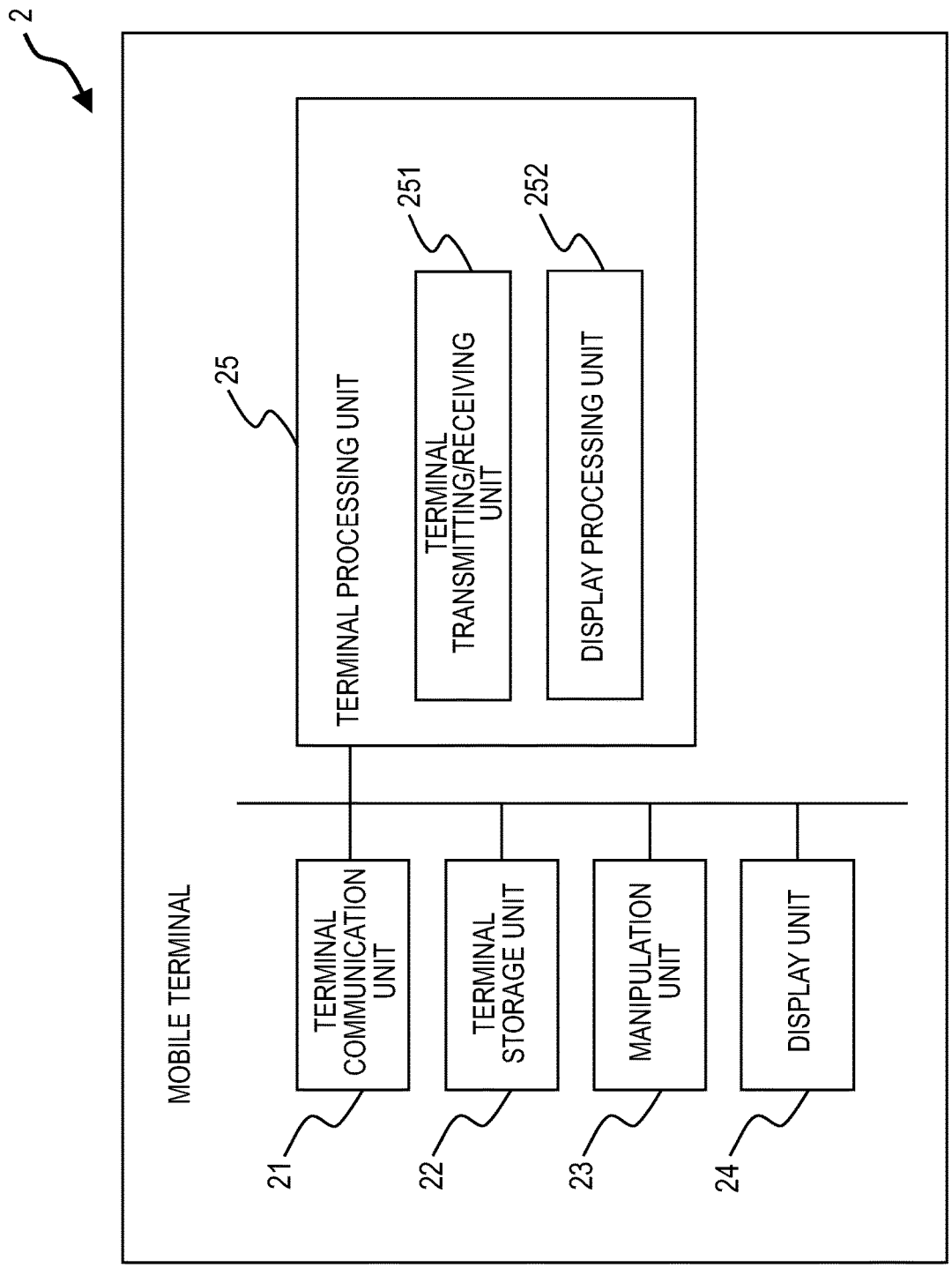
FIG. 3 is a diagram illustrating an exemplary embodiment of a schematic configuration of a mobile terminal 2.
Figure 4A:
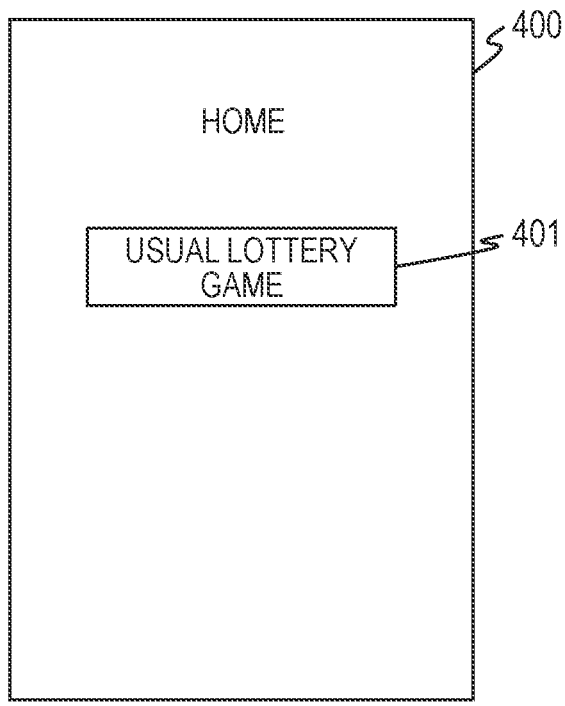
FIG. 4(*a*) is a diagram illustrating an exemplary embodiment of a screen to be displayed on a display unit 24 of the mobile terminal 2.
Figure 4B:
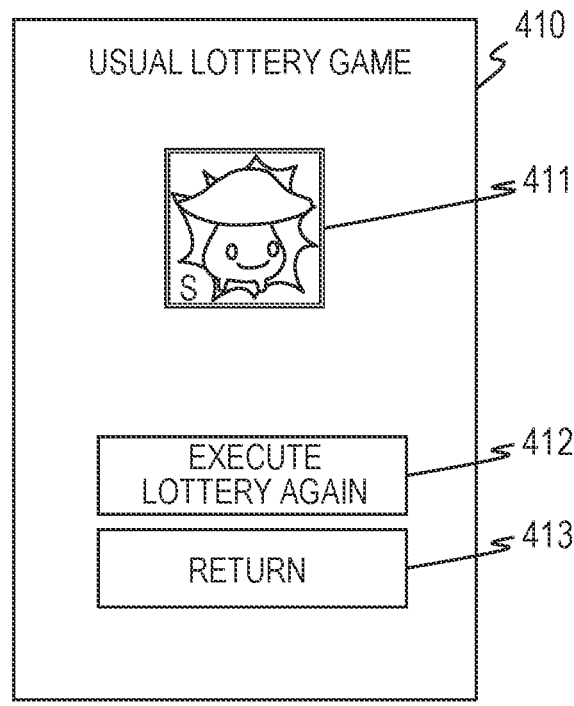
Figure 4C:
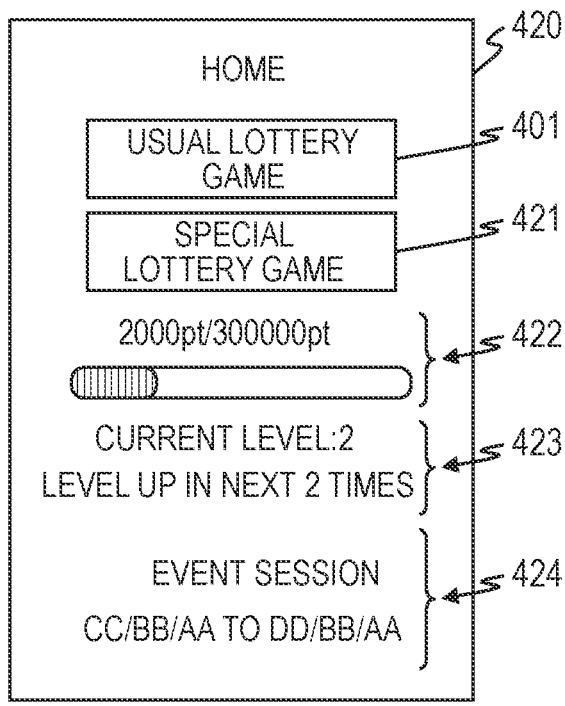
Figure 4D:
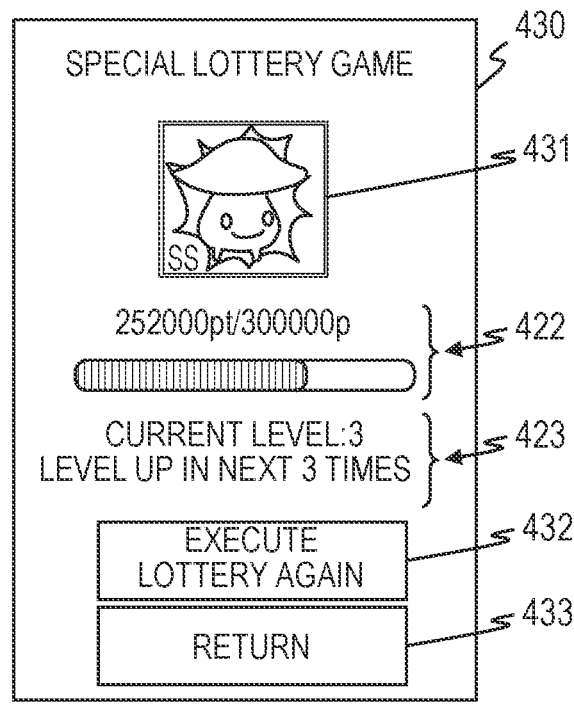

FIG. 3 may be a diagram illustrating an example of a schematic configuration of the mobile terminal 2.

The mobile terminal 2 may be connected to the server through the base station 4, the mobile communication network 5, the gateway 6, and the internet 7, and may perform communication with respect to the server 3. The mobile terminal 2 may control the progress of the game, according to various instructions input by the player. In addition, the mobile terminal 2 may receive various data items from the server 3, and may display a progress screen or the like of the game. For this reason, the mobile terminal 2 may include a terminal communication unit 21, a terminal storage unit 22, a manipulation unit 23, a display unit 24, and a terminal processing unit 25.

The terminal communication unit 21 may include a communication interface circuit including an antenna using a predetermined frequency band as a sensitive band, and connects the mobile terminal 2 to the communication network. The terminal communication unit 21 may establish a wireless signal line according to a code division multiple access (CDMA) system or the like with respect to the base station 4, through a channel assigned by the base station 4, and may perform the communication with respect to the base station 4. Then, the terminal communication unit 21 may transmit data supplied from the terminal processing unit 25, to the server 3. In addition, the terminal communication unit 21 may supply data received from the server 3 or the like, to the terminal processing unit 25.

The terminal storage unit 22, for example, may include a semiconductor memory device such as a read only memory (ROM) and a random access memory (RAM). The terminal storage unit 22 may store an operating system program, a driver program, an application program, data, and the like, which may be used in the processing of the terminal processing unit 25. The driver program stored in the terminal storage unit 22, may be an input device driver program of controlling the manipulation unit 23, an output device driver program of controlling the display unit 24, and the like. The application program stored in the terminal storage unit 22, may be a control program of controlling the progress of the game, and the like. The data stored in the terminal storage unit 22 may be various data items used for executing the game, and the like. In addition, the terminal storage unit 22 may temporarily store temporary data according to predetermined processing.

The manipulation unit 23 may be a pointing device such as a touch panel. Furthermore, the manipulation unit 23 may be an input key or the like. The player may be capable of inputting letters, numbers, and symbols, the position of the display unit 24 on the display screen, or the like, by using the manipulation unit 23. In a case where the manipulation unit 23 may be manipulated by the player, a signal corresponding to the manipulation may be generated. Then, the generated signal may be supplied to the terminal processing unit 25, as the instruction of the player.

The display unit 24 may be a liquid crystal display. Furthermore, the display unit 24 may be an organic electro-luminescence (EL) display or the like. The display unit 24 may display a video according to video data supplied from the terminal processing unit 25, an image according to image data, or the like.

The terminal processing unit 25 may include one or a plurality of processors and a peripheral circuit. The terminal processing unit 25 comprehensively may control the overall operation of the mobile terminal 2, for example, and may be a central processing unit (CPU). The terminal processing unit 25 may execute various forms of information processing in a suitable procedure, on the basis of the program stored in the terminal storage unit 22, various instructions input according to the manipulation of the manipulation unit 23 of the player, and the like, and may control the operation of the terminal communication unit 21 or the display unit 24. The terminal processing unit 25 may execute various forms of information processing on the basis of the operating system program, the driver program, and the application program, stored in the terminal storage unit 22. In addition, the terminal processing unit 25 may be capable of executing a plurality of programs in parallel.

The terminal processing unit 25 may include at least a terminal transmitting/receiving unit 251 and a display processing unit 252. Each of the units may be a functional module realized by a program which may be executed by a processor included in the terminal processing unit 25.

Alternatively, each of the units may be mounted on the mobile terminal 2 as firmware.

Hereinafter, an example of various screens to be displayed on the display unit 24 of the mobile terminal 2 will be described, with reference to FIG. 4 to FIG. 5.

FIG. 4(*a*) may be a diagram illustrating an example of a first home screen 400 to be displayed on the display unit 24 of the mobile terminal 2.

The first home screen 400, for example, may be a home screen to be displayed when the control program of this embodiment for executing the game is activated. In addition, the first home screen 400 may be a home screen to be displayed out of the event period. The first home screen 400 may include a usual game execution object 401.

The usual game execution object 401 may be a button object for instructing the execution of the usual lottery game. The usual game execution object 401 may be an icon image, a text, or the like. In a case where an input position on the first home screen 400, input according to the manipulation of the manipulation unit 23 of the player, is within a display region of the usual game execution object 401, a usual game execution instruction may be input into the mobile terminal 2. Thus, in a case where the player may perform a manipulation of selecting the usual game execution object 401, the usual game execution instruction may be input into the mobile terminal 2. In a case where the usual game execution instruction may be input by the player, the usual lottery game may be executed, and a usual game result screen 410 described below may be displayed on the display unit 24.

In a case where the usual game execution instruction may be input by the player, the usual lottery game may be executed in which a predetermined number of items of game content may be selected from the plurality of items of game content by a predetermined selection method. The game content selected by the usual lottery game, may be stored as the possession target of the player inputting the usual game execution instruction. Furthermore, in a case where the usual game execution instruction may be input by the player, processing of increasing the counter and processing of increasing the point value may not be executed.

FIG. 4(*b*) may be a diagram illustrating an example of the usual game result screen 410 to be displayed on the display unit 24 of the mobile terminal 2.

The usual game result screen 410 may be a screen for displaying an execution result of the usual lottery game. The usual game result screen 410 may include an acquired game content image 411, a usual game re-execution object 412, and a first home screen display instruction object 413.

The acquired game content image 411 may be an image of the game content, which may be stored as the possession target of the player according to the execution of the usual lottery game. Furthermore, various parameters such as a name, an attribute, and a degree of rarity of the game content corresponding to the acquired game content image 411 may be displayed, along with the acquired game content image 411.

The usual game re-execution object 412 may be a button object for instructing the execution of the usual lottery game. The usual game re-execution object 412 may be an icon image, a text, or the like. In a case where an input position on the usual game result screen 410, input according to the manipulation of the manipulation unit 23 of the player, may be within a display region of the usual game re-execution object 412, the usual game execution instruction may be input into the mobile terminal 2. Thus, in a case where the player manipulates the manipulation unit 23 to select the usual game re-execution object 412, the usual game execution instruction may be input into the mobile terminal 2. In a case where the usual game execution instruction may be input by the player, the usual lottery game may be executed again, and the usual game result screen 410 may be displayed on the display unit 24.

The usual lottery game may be executed according to the usual game execution instruction in a case where the usual game re-execution object 412 may be selected. The game content selected by the usual lottery game, may be stored as the possession target of the player inputting the usual game execution instruction. Furthermore, the processing of increasing the counter and the processing of increasing the point value may not be executed, according to the usual game execution instruction in a case where the usual game re-execution object 412 may be selected.

The first home screen display instruction object 413 may be a button object for ending the display of the usual game result screen 410, and for displaying again the first home screen 400. Furthermore, the first home screen display instruction object 413 may be an icon image, a text, or the like. In a case where an input position on the usual game result screen 410, input according to the manipulation of the manipulation unit 23 of the player, may be within a display region of the first home screen display instruction object 413, the home screen display instruction may be input into the mobile terminal 2. Thus, in a case where the player manipulates the manipulation unit 23 to select the first home screen display instruction object 413, the display of the usual game result screen 410 may be ended, and the first home screen 400 may be displayed again.

FIG. 4(*c*) may be a diagram illustrating an example of a second home screen 420 to be displayed on the display unit of the mobile terminal 2. In FIG. 4(*c*), the same reference numerals as those in FIG. 4(*a*) may be provided to the same constituents as those of the first home screen 400 illustrated in FIG. 4(*a*).

The second home screen 420, for example, may be a home screen to be displayed when the control program of this embodiment for executing the game is activated. In addition, the second home screen 420 may be a home screen to be displayed in a case where the current point of the group to which the player belongs, does not reach the point value setting value, within the event period.

The second home screen 420 may include the usual game execution object 401, a special game execution object 421, a point accumulation result 422, a counter accumulation result 423, and an event period 424.

The usual game execution object 401 included in the second home screen 420, may have the same function as that of the usual game execution object 401 included in the first home screen 400.

The special game execution object 421 may be a button object for instructing the execution of the special lottery game. The special game execution object 421 may be an icon image, a text, or the like. In a case where an input position on the second home screen 420, input according to the manipulation of the manipulation unit 23 of the player may be within a display region of the special game execution object 421, a special game execution instruction may be input into the mobile terminal 2. Thus, in a case where the player performs a manipulation of selecting the special game execution object 421, the special game execution instruction may be input into the mobile terminal 2. In a case where the special game execution instruction is input by the player, the special lottery game may be executed, and a special game result screen 430 described below may be displayed on the display unit 24.

In a case where the special game execution instruction is input by the player, the special lottery game may be executed in which the predetermined number of first items of game content may be selected from the plurality of first items of game content by a predetermined selection method. The selected first game content may be stored as the possession target of the player inputting the special game execution instruction. Furthermore, in a case where the special game execution instruction is input by the player, the processing of increasing the counter and the processing of increasing the point value may be executed.

The point value accumulation result 422 may be information relevant to the current point of the group to which the player belongs, at a timing when the second home screen 420 may be displayed. The information relevant to the current point, for example, may include numerical information indicating the current point. In addition, the information relevant to the current point may include numerical information indicating the point setting value.

In addition, the information relevant to the current point may include a graph image illustrating the current point. In the example illustrated in FIG. 4(*c*), the graph image may be a gauge, and the maximum value of the gauge may be the point setting value. In addition, in the gauge, the current point value may be displayed to be identifiable. Furthermore, the name of the group corresponding to the point value, or the description of the group, may be displayed, along with the point accumulation result 422. Thus, the player belonging to the group may be capable of instantly determining the point value of the group by only confirming the point accumulation result 422.

The counter accumulation result 423 may be information relevant to the current counter of the player, at a timing when the second home screen 420 may be displayed. The information relevant to the current counter, for example, may include an accumulation level of the current counter of the player. In a case where an integer value of greater than or equal to "1" is divided into a plurality of numerical ranges, the accumulation level may be level information corresponding to each of the numerical ranges. For example, in a case where the counter is within a numerical range of greater than or equal to "1" and less than "15", the accumulation level may be "1", in a case where the counter is within a numerical range of greater than or equal to "15" and less than "30", the accumulation level may be "2", and in a case where the counter is within a numerical range of greater than or equal to "30", the accumulation level may be "3". The number of numerical ranges may not be limited to 3, and may be 2, or may be greater than or equal to 4. In the example illustrated in FIG. 4(*c*), "2" may be displayed on the counter accumulation result 423, as the accumulation level.

The information relevant to the current counter, for example, may include numerical information indicating the current counter. In addition, the information relevant to the current counter may include numerical information indicating the remaining counter until the accumulation level may be changed.

The event period 424 information relevant to the event period. The event period may include an end date of the event. In addition, the event period may include a start time of the event.

FIG. 4(*d*) may be a diagram illustrating an example of the special game result screen 430 to be displayed on the display unit 24 of the mobile terminal 2. In FIG. 4(*d*), the same reference numerals as those in FIG. 4 (*c*) may be provided to the same constituents as those of the second home screen 420 illustrated in FIG. 4(*c*).

The special game result screen 430 may be a screen for displaying an execution result of the special lottery game. The special game result screen 430 may include an acquired first game content image 431, the point accumulation result 422, the counter accumulation result 423, the special game re-execution object 432, and the second home screen display instruction object 433.

The acquired first game content image 431 may be an image of the first game content, which may be stored as the possession target of the player according to the execution of the usual lottery game. Furthermore, various parameters such as a name, an attribute, and a degree of rarity of the first game content corresponding to the acquired first game content image 431 may be displayed, along with the acquired first game content image 431.

The point accumulation result 422 and the counter accumulation result 423 included in the special game result screen 430, may have the same functions as those of the point accumulation result 422 and the counter accumulation result 423 of the second home screen 420. That is, the point accumulation result 422 included in the special game result screen 430, may be information relevant to the current point of the group to which the player belongs, at a timing when the special game result screen 430 may be displayed. In addition, the counter accumulation result 423 included in the special game result screen 430, may be information relevant to the current counter of the player, at a timing when the special game result screen 430 may be displayed.

The special game re-execution object 432 may be a button object for instructing the execution of the special lottery game. The special game re-execution object 432 may be an icon image, a text, or the like. In a case where an input position on the special game result screen 430, input according to the manipulation of the manipulation unit 23 of the player, may be within a display region of the special game re-execution object 432, the special game execution instruction may be input into the mobile terminal 2. Thus, in a case where the player performs a manipulation of selecting the special game re-execution object 432, the special game execution instruction may be input into the mobile terminal 2. In a case where the special game execution instruction is input by the player, the special lottery game may be executed again, and the special game result screen 430 may be displayed on the display unit 24.

According to the special game execution instruction in a case where the special game re-execution object 432 is selected, the special lottery game may be executed. The first game content selected by the special lottery game, may be stored as the possession target of the player inputting the special game execution instruction. Furthermore, according to the special game execution instruction in a case where the special game re-execution object 432 is selected, processing may be executed to increase the counter and the point value.

The second home screen display instruction object 433 may be a button object for ending the display of the special game result screen 430, and for displaying the second home screen 420 again. Furthermore, the second home screen display instruction object 433 may be an icon image, a text, or the like. In a case where an input position on the special game result screen 430, input according to the manipulation of the manipulation unit 23 of the player, is within a display region of the second home screen display instruction object 433, the home screen display instruction may be input into the mobile terminal 2. Thus, in a case where the player performs a manipulation of selecting the second home screen display instruction object 433, the display of the special game result screen 430 may be ended, and the second home screen 420 may be displayed again. Furthermore, in a case where the timing of when the player performs the manipulation of selecting the second home screen display instruction object 433 is out of the event period, a fourth home screen 510 may be displayed. In addition, in a case where the point value associated with the group to which the player belongs reaches the point value setting value, at the timing when the player performs the manipulation of selecting the second home screen display instruction object 433, a third home screen 500 may be displayed.

Figure 5A:
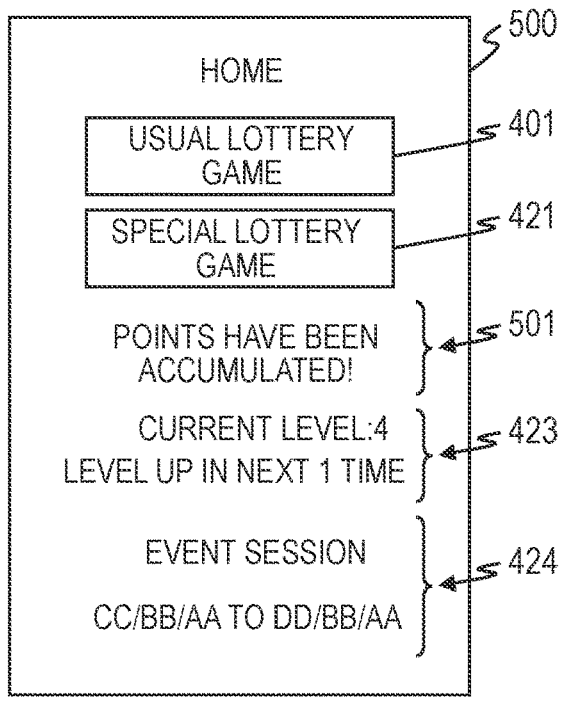
FIG. 5(*a*) is a diagram illustrating an exemplary embodiment of the screen to be displayed on the display unit 24 of the mobile terminal 2.
Figure 5B:
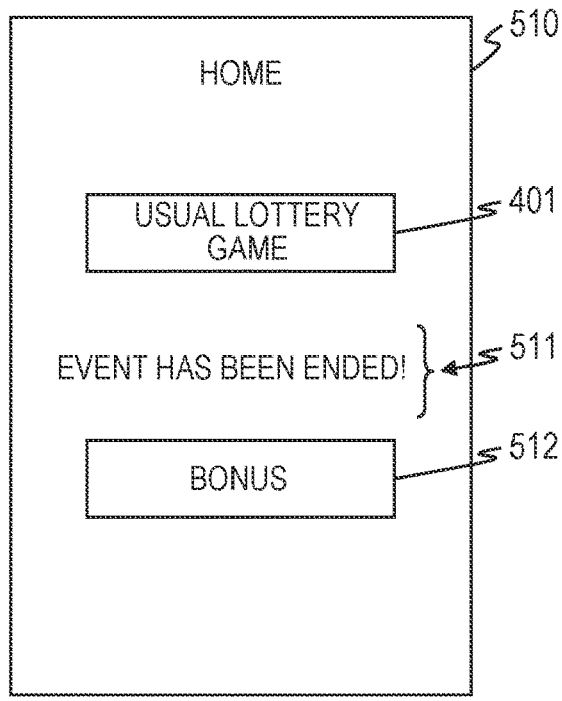
Figure 5C:
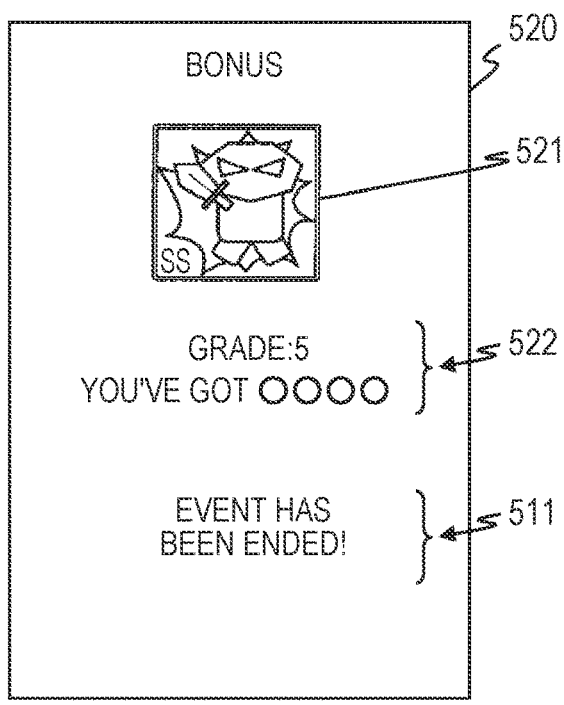

FIG. 5(*a*) may be a diagram illustrating an example of the third home screen 500 to be displayed on the display unit 24 of the mobile terminal 2. In FIG. 5(*a*), the same reference numerals as those in FIG. 4(*c*) may be provided to the same constituents as those of the second home screen 420 illustrated in FIG. 4(*c*).

The third home screen 500, for example, may be a home screen to be displayed when the control program of this embodiment for executing the game is activated. In addition, the third home screen 500 may be a home screen to be displayed in a case where the current point of the group to which the player belongs, reaches the point setting value within the event period.

The third home screen 500 may include the usual game execution object 401, the special game execution object 421, a point accumulation completion result 501, the counter accumulation result 423, and the event period 424.

The usual game execution object 401 and the special game execution object 421 included in the third home screen 500, have the same functions as those of the usual game execution object 401 and the special game execution object 421 included in the second home screen 420.

The point accumulation completion result 501 may be information indicating that the current point value of the group to which the player belongs has reached the point setting value. The information indicating that the current point value has reached the point setting value, may include numerical information indicating the point setting value.

The counter accumulation result 423 and the event period 424 included in the third home screen 500, may have the same functions as those of the counter accumulation result 423 and the event period 424 of the second home screen 420. The counter accumulation result 423 included in the third home screen 500, may be information relevant to the current counter of the player, at a timing when the third home screen 500 may be displayed.

FIG. 5(*b*) may be a diagram illustrating an example of the fourth home screen 510 to be displayed on the display unit 24 of the mobile terminal 2. In FIG. 5(*b*), the same reference numerals as those in FIG. 4(*a*) may be provided to the same constituents as those of the first home screen 400 illustrated in FIG. 4(*a*).

The fourth home screen 510, for example, may be a home screen to be displayed when the control program of this embodiment for executing the game may be activated. In addition, the fourth home screen 510 may be a home screen to be displayed in a case where the event in which the player participates is ended, and the player does not acquire the second game content as a reward.

The fourth home screen 510 may include the usual game execution object 401, an event end result 511, and a reward presentation object 512.

The usual game execution object 401 included in the fourth home screen 510, has the same function as that of the usual game execution object 401 included in the first home screen 400.

The event end result 511 may be information indicating that the event in which the player participates has been ended.

The reward presentation object 512 may be a button object for displaying a reward presentation screen 520. Furthermore, the reward presentation object 512 may be an icon image, a text, or the like. In a case where an input position on the fourth home screen 510, input according to the manipulation of the manipulation unit 23 of the player, is within a display region of the reward presentation object 512, a reward display instruction may be input into the mobile terminal 2. Thus, in a case where the player may perform a manipulation of selecting the reward presentation object 512, the reward display instruction may be input into the mobile terminal 2. In a case where the reward display instruction is input by the player, the reward presentation screen 520 described below may be displayed on the display unit 24.

FIG. 5(*c*) may be a diagram illustrating an example of the reward presentation screen 520 to be displayed on the display unit 24 of the mobile terminal 2.

The reward presentation screen 520 may be a screen for presenting the second game content associated with the player according to the execution result of the special lottery game, as the reward. The reward presentation screen 520 may include a reward image 521, a reward described 522, and the event end result 511.

The reward image 521 may be the image of the second game content associated with the player as the reward, according to the participation of the player in the special lottery game. The reward described 522 may be information relevant to the second game content associated with the player as the reward. The information relevant to the second game content, for example, may be various parameters such as a name, an attribute, and a degree of rarity of the second game content, indicated by the reward image 521. In addition, the information relevant to the second game content may include an accumulation level of the counter of the second game content, indicated by the reward image 521. Thus, not only may the first game content be simply obtained by a lottery, but, also, a common goal may be set for the players belonging to the group, and thus, it may be possible to increase a sense of solidarity in the players, and to improve a participating rate or a continuation rate of the game. In addition, in a case where the point value of the group reaches the point setting value, the second game content according to an individual contribution rate of the player may be provided, and thus, the motivation for participating in the special lottery game may increase, and therefore, it may be possible to increase the number of participating players, and to improve the participating rate with respect to the game.

Figure 6:
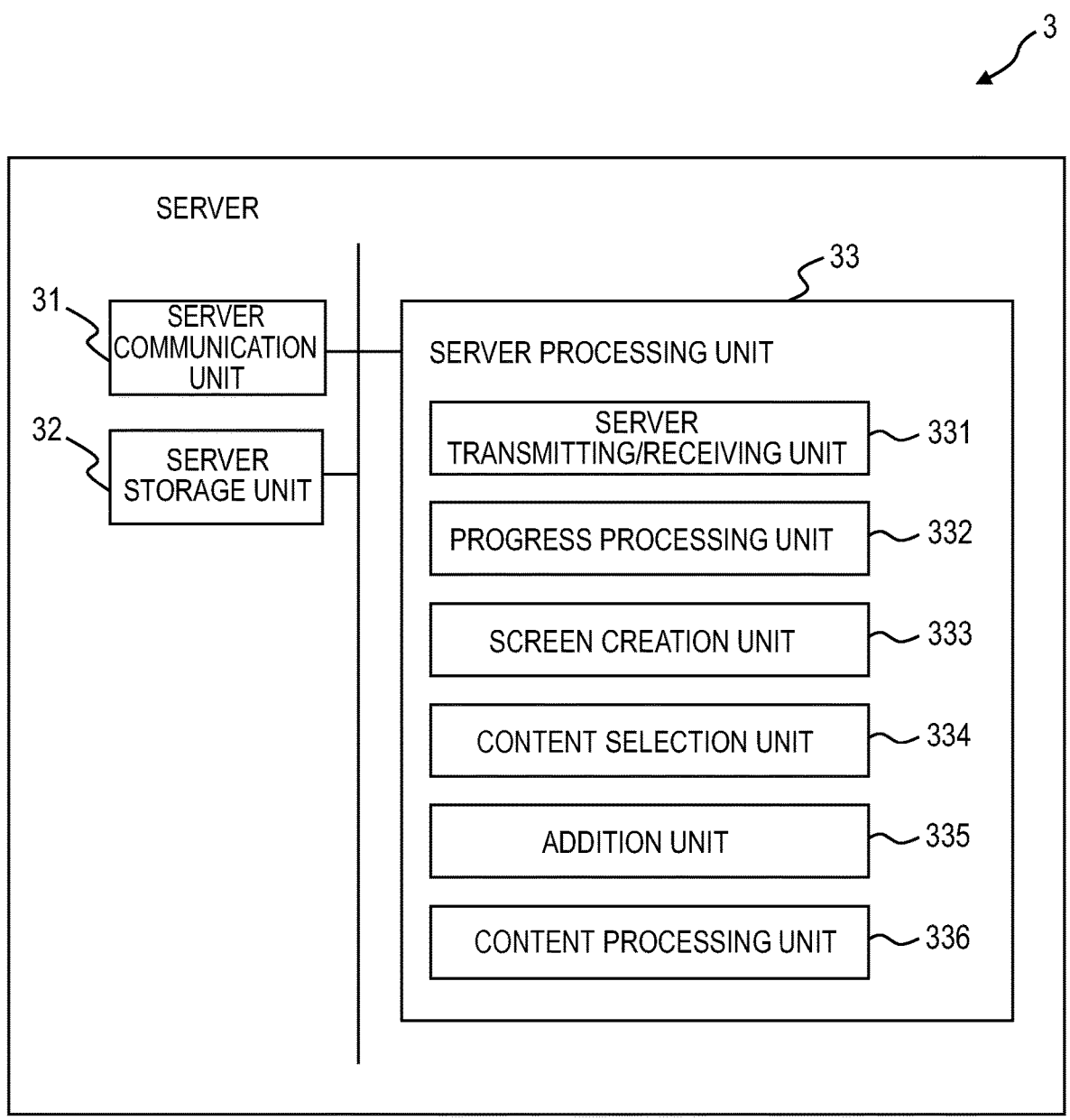
FIG. 6 may be a diagram illustrating an exemplary embodiment of a schematic configuration of a server 3.

FIG. 6 may be a diagram illustrating an example of a schematic configuration of the server 3.

The server 3 may manage the progress of the game, according to a request from the mobile terminal 2. In addition, the server 3 may create game control data or the like according to the progress of the game, and may transmit the game control data to the mobile terminal 2. For this reason, the server 3 may include a server communication unit 31, a server storage unit 32, and a server processing unit 33.

The server communication unit 31 may include a communication interface circuit for connecting the server 3 to the internet 7, and may perform communication with respect to the internet 7. Then, the server communication unit 31 may supply data received from the mobile terminal 2 or the like, to the server processing unit 33. In addition, the server communication unit 31 may transmit the data supplied from the server processing unit 33, to the mobile terminal 2 or the like.

The server storage unit 32, for example, may include at least one of a magnetic tape device, a magnetic disk device, and an optical disk device. The server storage unit 32 may store an operating system program, a driver program, an application program, data, and the like, which may be used in the processing of the server processing unit 33. The application program stored in the server storage unit 32, may be a game program or the like, which may manage the game executed by each of the mobile terminals 2, and may create the game control data for controlling the game for each of the mobile terminals 2. A computer program stored in the server storage unit 32, for example, may be installed in the terminal storage unit 22, by using a known setup program or the like, from a computer-readable transportable recording medium such as a CD-ROM and a DVD-ROM.

The data stored in the server storage unit 32, may be an item of game content table T1 and an event table T2, a player table T3 and a group table 14, and the like. In addition, the server storage unit 32 may store various image data items or the like according to the progress of the game. Further, the server storage unit 32 may temporarily store temporary data according to predetermined processing. That is, the server storage unit 32 may include a volatile memory (a random access memory (RAM)), and may store dynamic data varying according to the progress of the game.

Hereinafter, an example of data structures of various tables stored in the server storage unit 32, will be described by using FIG. 7 to FIG. 8.

FIG. 7(*a*) illustrates the game content table T1 of managing the game content. In the game content table T1, parameters such as a game content identification (ID), a game content name, an image, a degree of rarity, a level, an HP, attack power, and defense power of the game content, may be stored in association with each other, with respect to each of the items of game content.

The game content ID may be an example of the identification information for uniquely identifying each of the items of game content. A file name of an image illustrating the game content may be stored in the image.

For example, information indicating normal, rare, super (S) rare, double super (SS) rare, triple super (SSS) rare, legend, or the like, may be stored in the degree of rarity.

FIG. 7(*b*) illustrates the event table T2 of managing the event. In the event table T2, an event ID, an event period, a selection target, a reward target, and the like of the event may be stored in association with each other, with respect to each of the events.

The event ID may be an example of the identification information for uniquely identifying each of the events. The event period may be a period in which the special game execution instruction for executing the special lottery game can be received. The game content ID of the first game content, which becomes the selection target in the special lottery game, may be stored in the selection target. The game content ID of the second game content, which becomes the reward target in the special lottery game, may be stored in the reward target, in association with the accumulation level.

FIG. 8(*a*) illustrates the player table T3 of managing the player. In the player table T3, a player ID of each of the players, a name of each of the players, a possessed game content, counter information, second game content information, and the like, may be stored in association with each other, with respect to each of the players.

The player ID may be an example of the identification information for uniquely identifying each of the players. The game content ID of the game content possessed by the player may be stored in the possessed game content, in association with the possessed ID. The counter which may increase whenever the special game execution instruction may be input by the player, and the event ID of the event according to the special lottery game executed by the special game execution instruction which may be input by the player, may be stored in the counter information.

The game content ID of the second game content acquired by the player as the reward, and the event ID of the event in which the special lottery game executed by the player may be performed, may be stored in the second game content information.

FIG. 8(*b*) illustrates the group table 14 of managing the group. In the group table T4, a group ID of the group, an attending player, point information, and the like, may be stored in association with each other, with respect to each of the groups.

The group ID may be an example of the identification information for uniquely identifying each of the groups. The player ID of the player belonging to the group may be stored under the attending player heading. The point value which may increase whenever the special game execution instruction may be input by the player, and the event ID of the event according to the special lottery game executed by the special game execution instruction which may be input by the player, may be stored in the point value information.

Returning to FIG. 6, the server processing unit 33 may include at least a server transmitting/receiving unit 331, a progress processing unit 332, a screen creation unit 333, a content selection unit 334, an addition unit 335, and a content processing unit 336. Each of the units may be a functional module realized by a program which may be executed by a processor included in the server processing unit 33. Alternatively, each of the units may be mounted on the server 3 as firmware.

Hereinafter, an example of each of the functions of the terminal transmitting/receiving unit 251 and the display processing unit 252 included in the terminal processing unit 25 of the mobile terminal 2 will be described. In addition, an example of each of the functions of the server transmitting/ receiving unit 331, the progress processing unit 332, the screen creation unit 333, the content selection unit 334, the addition unit 335, and the content processing unit 336 included in the server processing unit 33 of the server 3 will be described.

The terminal transmitting/receiving unit 251 may transmit the home screen display instruction input according to the manipulation of the manipulation unit 23 of the player, to the server 3 through the terminal communication unit 21, along with the player ID. The home screen display instruction, for example, may be an instruction to be input in a case where an activation icon or the like (not illustrated) for activating the lottery game of this embodiment may be selected according to the manipulation of the manipulation unit 23 of the player.

In addition, the terminal transmitting/receiving unit 251 may receive home screen display data for displaying the first home screen 400, from the server 3 through the terminal communication unit 21. In addition, the terminal transmitting/receiving unit 251 may receive home screen display data for displaying the second home screen 420, from the server 3 through the terminal communication unit 21. In addition, the terminal transmitting/receiving unit 251 may receive home screen display data for displaying the third home screen 500, from the server 3 through the terminal communication unit 21. In addition, the terminal transmitting/receiving unit 251 may receive home screen display data for displaying the fourth home screen 510, from the server 3 through the terminal communication unit 21.

In addition, the terminal transmitting/receiving unit 251 may transmit various instructions acquired by the display processing unit 252 described below, to the server 3 through the terminal communication unit 21, along with the player ID. In addition, the terminal transmitting/receiving unit 251 may receive display data for displaying the usual game result screen 410, from the server 3 through the terminal communication unit 21. In addition, the terminal transmitting/receiving unit 251 may receive display data for displaying the special game result screen 430, from the server 3 through the terminal communication unit 21. In addition, the terminal transmitting/receiving unit 251 may receive display data for displaying the reward presentation screen 520, from the server 3 through the terminal communication unit 21.

The display processing unit 252 may display any one of the first home screen 400, the second home screen 420, the third home screen 500, and the fourth home screen 510, on the display unit 24, on the basis of the home screen display data received by the terminal transmitting/receiving unit 251. In addition, the display processing unit 252 may display various screens (any one of the usual game result screen 410, the special game result screen 430, and the reward presentation screen 520), on the display unit 24, on the basis of various display data items received by the terminal transmitting/receiving unit 251.

In addition, the display processing unit 252 may acquire various instructions input according to the manipulation of the manipulation unit 23 of the player, in any one of the first home screen 400, the second home screen 420, the third home screen 500, and the fourth home screen 510, displayed on the display unit 24.

In addition, the display processing unit 252 may acquire various instructions input according to the manipulation of the manipulation unit 23 of the player, in any one of the usual game result screen 410 and the special game result screen 430, displayed on the display unit 24.

The server transmitting/receiving unit 331 may receive the home screen display instruction from the mobile terminal 2 through the server communication unit 31. In addition, the server transmitting/receiving unit 331 may transmit the home screen display data for displaying the first home screen 400 created by home screen creation processing, to the mobile terminal 2 through the server communication unit 31. In addition, the server transmitting/receiving unit 331 may transmit the home screen display data for displaying the second home screen 420 created by the home screen creation processing, to the mobile terminal 2 through the server communication unit 31. In addition, the server transmitting/receiving unit 331 may transmit the home screen display data for displaying the third home screen 500 created by the home screen creation processing, to the mobile terminal 2 through the server communication unit 31. In addition, the server transmitting/receiving unit 331 may transmit the home screen display data for displaying the fourth home screen 510 created by the home screen creation processing, to the mobile terminal 2 through the server communication unit 31.

In addition, the server transmitting/receiving unit 331 may receive various instructions from the mobile terminal 2 through the server communication unit 31. In addition, the server transmitting/receiving unit 331 may transmit various display data items for displaying various screens created by game progress processing, to the mobile terminal 2 through the server communication unit 31.

The progress processing unit 332 determines whether or not date and time when the server transmitting/receiving unit 331 may acquire the home screen display instruction, may be within the event period. For example, in a case where the home screen display instruction may be acquired by the server transmitting/receiving unit 331, the progress processing unit 332 determines whether or not the event period including the date and time when the home screen display instruction may be acquired, may be stored in the event stored in the event table T2. In a case where the event period including the date and time when the home screen display instruction is acquired, is stored in the event table T2, the progress processing unit 332 may determine that the date and time, when the home screen display instruction is acquired, is within the event period. In addition, in a case where the event period, including the date and time when the home screen display instruction is acquired, is not stored in the event table T2, the progress processing unit 332 may determine that the date and time when the home screen display instruction is acquired, is out of the event period. Furthermore, the progress processing unit 332 may determine whether or not date and time when the home screen display instruction is transmitted by the mobile terminal 2, is within the event period.

In addition, in a case where it is determined that the date and time when the server transmitting/receiving unit 331 has acquired the home screen display instruction, is out of the event period, the progress processing unit 332 may determine whether or not the player may acquire the second game content in the event ended just before, as the reward. For example, the progress processing unit 332 may extract the event ID associated with the event period of the end date closest to the current date and time, from the event table T2. Next, the progress processing unit 332 may extract the counter information and the second game content information, associated with a player ID acquired along with the home screen display instruction, from the player table T3. Next, the progress processing unit 332 may determine whether or not the event ID identical to the extracted event ID may be stored in the extracted counter information. Furthermore, in a case where it is determined that the event ID identical to the extracted event ID is not stored in the extracted counter information, the progress processing unit 332 may determine that the player does not acquire the second game content in the event ended just before, as the reward. Next, in a case where it is determined that the event ID identical to the extracted event ID is stored in the extracted counter information, the progress processing unit 332 may determine whether or not the event ID identical to the extracted event ID is stored in the extracted second game content information. Furthermore, in a case where it is determined that the event ID identical to the extracted event ID is not stored in the extracted second game content information, the progress processing unit 332 may determine that the player does not acquire the second game content in the event ended just before, as the reward. Next, in a case where it is determined that the event ID identical to the extracted event ID is stored in the extracted second game content information, the progress processing unit 332 may determine that the player may acquire the second game content in the event ended just before, as the reward.

In addition, in a case where it is determined that when the date and time when the server transmitting/receiving unit 331 has acquired the home screen display instruction, is within the event period, the progress processing unit 332 may determine whether or not the point value of the group to which the player belongs, has reached the point setting value. For example, the progress processing unit 332 may extract the event ID associated with the event period including the date and time when the server transmitting/receiving unit 331 has acquired the home screen display instruction, from the event table T2. Next, the progress processing unit 332 may extract the point value information including the extracted event ID from the group table T4, and may extract a point included in the point value information. Then, the progress processing unit 332 may determine whether or not the extracted point reaches the point setting value.

In a case where a first condition is satisfied, the screen creation unit 333 may create the display data for displaying the first home screen 400. The first condition may be a condition in which the date and time when the server transmitting/receiving unit 331 has acquired the home screen display instruction may be out of the event period, and the player does not acquire the reward in the event ended just before.

The first home screen 400 may not include an object for the special game execution instruction (the special game execution object 421 or the like). Therefore, in a case where the first condition is satisfied, the special lottery game may not be executed.

In addition, in a case where a second condition is satisfied, the screen creation unit 333 may create the display data for displaying the second home screen 420. The second condition may be a condition in which the date and time when the server transmitting/receiving unit 331 has acquired the home screen display instruction, may be within the event period, and the point value of the group to which the player belongs has not reached the point value setting value.

The second home screen 420 may include the special game execution object 421 for the special game execution instruction. Therefore, in a case where the second condition is satisfied, the special lottery game may be executed.

In addition, in a case where a third condition is satisfied, the screen creation unit 333 may create the display data for displaying the third home screen 500. The third condition may be a condition in which the date and time when the server transmitting/receiving unit 331 has acquired the home screen display instruction, may be within the event period, and the point value of the group to which the player belongs may have reached the point setting value.

The third home screen 500 may include the special game execution object 421 for the special game execution instruction. Therefore, in a case where the third condition may be satisfied, the special lottery game may be executed. That is, the special game execution instruction may be received until the event period is ended. In addition, even in a case where the point value associated with the group reaches the point setting value before the event period is ended, the special lottery game may be continuously executed according to the special game execution instruction. In addition, even in a case where the point value associated with the group reaches the point setting value before the event period is ended, processing of increasing the counter associated with the player inputting the special game execution instruction may be continuously executed.

In addition, in a case where a fourth condition is satisfied, the screen creation unit 333 may create the display data for displaying the fourth home screen 510. The fourth condition may be a condition in which the date and time when the server transmitting/receiving unit 331 has acquired the home screen display instruction is out of the event period, and the player may acquire the reward in the event ended just before.

The fourth home screen 510 may not include an object for the special game execution instruction (the special game execution object 421 or the like). Therefore, in a case where the fourth condition is not satisfied, the special lottery game may be not executed.

In addition, in a case where the usual lottery game is executed by the content selection unit 334 described below, the screen creation unit 333 may extract an image corresponding to the game content ID selected by the usual lottery game, from the game content table T1. Then, the screen creation unit 333 may create the display data for displaying the usual game result screen 410, on the basis of the extracted image.

In addition, in a case where the special lottery game is executed by the content selection unit 334 described below, the screen creation unit 333 may extract an image corresponding to the game content ID of the first game content selected by the special lottery game, from the game content table T1. The screen creation unit 333 may specify the group ID of the group which has the player ID of the player associated with the group as the attending player, and may extract the point value information associated with the specified group ID, from the group table T4. Then, the screen creation unit 333 may create the display data for displaying the special game result screen 430, on the basis of the extracted image and the point value information.

In addition, in a case where the second game content is stored by the content processing unit 336, in association with the player, as the reward, the screen creation unit 333 may extract the counter information associated with the player from the player table T3. Next, the screen creation unit 333 may extract an image associated with the game content ID of the second game content which may be associated with the player, from the game content table T1, as the reward. Then, the screen creation unit 333 may create the display data for displaying the reward presentation screen 520, on the basis of an accumulation level corresponding to the counter included in the extracted counter information, and the extracted image.

In a case where an instruction acquired by the server transmitting/receiving unit 331 is the usual game execution instruction, the content selection unit 334 may execute the usual lottery game. For example, the content selection unit 334 may extract the game content ID from the game content table T1. Next, the content selection unit 334 may select a predetermined number of game content IDs from the extracted game content ID by a predetermined selection method. Then, the content selection unit 334 may newly store the selected game content ID in the player table T3, in association with the possessed ID, as the possessed game content of the player.

In addition, in a case where the instruction acquired by the server transmitting/receiving unit 331 is the special game execution instruction, the content selection unit 334 may execute the special lottery game. For example, the content selection unit 334 may extract the game content ID of the selection target associated with the event period including the date and time when the server transmitting/receiving unit 331 may acquire the special game execution instruction, from the event table T2. Next, the content selection unit 334 may select a predetermined number of game content IDs from the extracted game content ID by a predetermined selection method. Then, the content selection unit 334 may newly store the selected game content ID in the player table T3 in association with the possessed ID, as the possessed game content of the player.

In a case where the special lottery game is executed by the content selection unit 334, the addition unit 335 may increase the counter associated with the player. For example, the addition unit 335 may extract the event ID associated with the event period including the date and time when the server transmitting/receiving unit 331 had acquired the special game execution instruction, from the event table T2. Next, the addition unit 335 may extract the counter information associated with the received player ID, along with the special game execution instruction, from the player table T3, and may determine whether or not the extracted event ID is included in the extracted counter information. Next, in a case where the extracted event ID is included in the extracted counter information, the addition unit 335 may add a predetermined number (for example "1") to the counter included in the extracted counter information, and may store the added counter in the player table T3. In addition, in a case where the extracted event ID may not be included in the extracted counter information, the addition unit 335 may store new counter information including a predetermined number (for example "1") and the extracted event ID, in the player table T3.

In addition, in a case where the special lottery game is executed by the content selection unit 334, the addition unit 335 may increase the point value associated with the group to which the player belongs. For example, the addition unit 335 may extract the event ID associated with the event period including the date and time when the server transmitting/receiving unit 331 may acquire the special game execution instruction, from the event table T2. Next, the addition unit 335 may determine which group is associated with the player ID that was received along with the special game execution instruction, may specify the group ID of this group, and may extract the point value information associated with the specified group ID, from the group table 14. Next, the addition unit 335 may determine whether or not the extracted event ID may be included in the extracted point information. Next, in a case where the extracted event ID is included in the extracted point information, the addition unit 335 may add the additional point value to the point value included in the extracted point information, and may store the added point in the group table T4. In addition, in a case where the extracted event ID is not included in the extracted point information, the addition unit 335 may store new point information including a predetermined point and the extracted event ID, in the group table T4.

Furthermore, in a case where the point value associated with the group to which the player belongs, reaches the point setting value, the addition unit 335 may not execute the processing of increasing the point.

In a case where the instruction acquired by the server transmitting/receiving unit 331 is the reward display instruction, the content processing unit 336 may extract the counter information associated with the player ID received along with the reward display instruction, from the player table T3. Next, the event ID associated with the event period of the end date closest to the current date and time, may be extracted from the event table T2. Next, the content processing unit 336 may select the game content ID associated with the accumulation level corresponding to the counter included in the extracted counter information, from the reward target associated with the extracted event ID, which may be stored in the event table T2. Then, the content processing unit 336 may store the second game content information including the selected game content ID and the extracted event ID, in the player table T3, in association with the player ID of the player. Accordingly, the second game content according to the counter associated with the player, may be stored in association with the player, as the reward.

Figure 9:
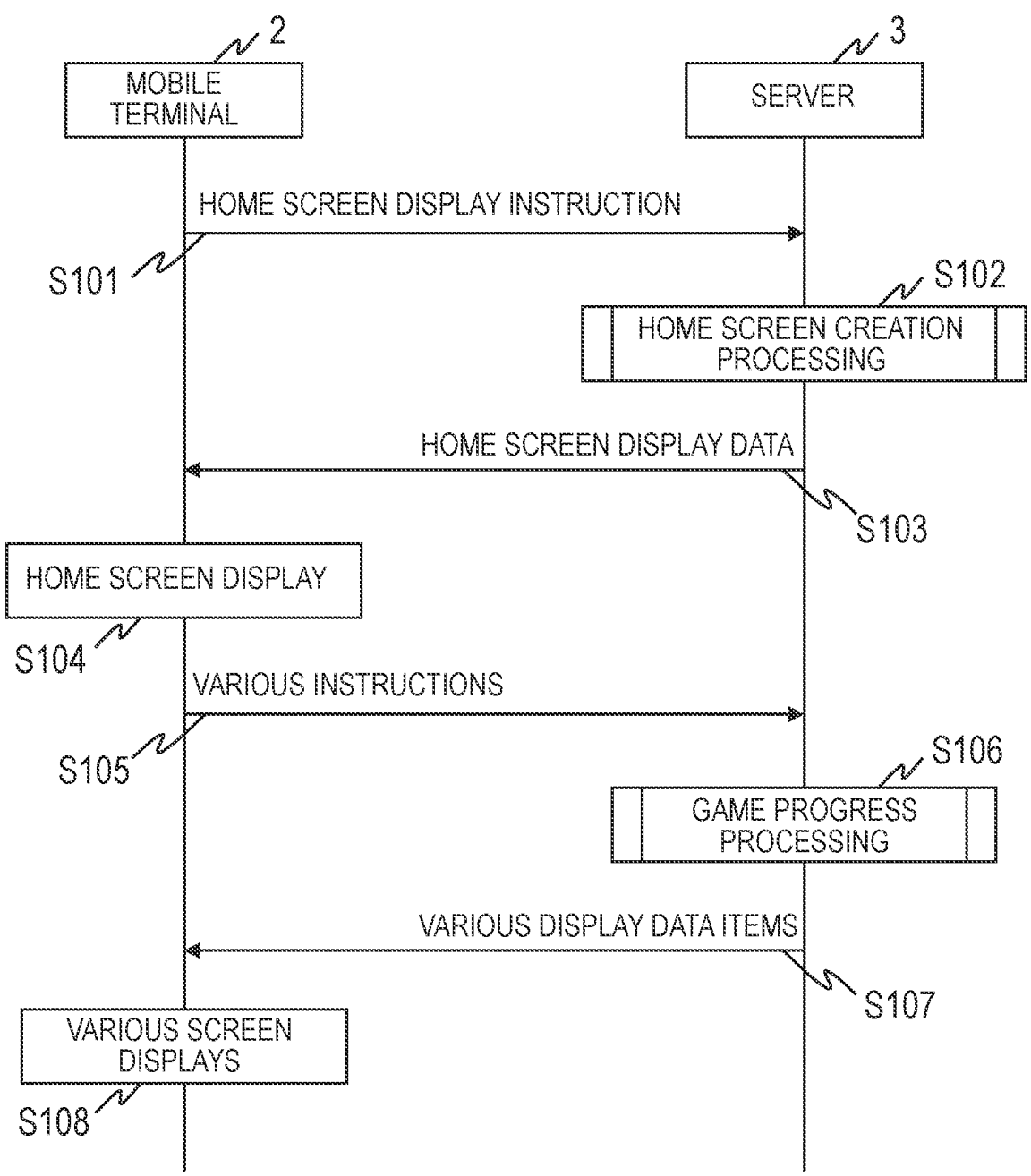
FIG. 9 may be a diagram illustrating an exemplary embodiment of an operation sequence of the game system 1.

FIG. 9 may be a diagram illustrating an example of an operation sequence of the game system 1. The operation sequence may be mainly executed by the terminal processing unit 25 and the server processing unit 33, on the basis of the program stored in advance in the terminal storage unit 22 and the server storage unit 32, in cooperation with each constituent of the mobile terminal 2 and the server 3.

Initially, the terminal transmitting/receiving unit 251 of the mobile terminal 2 may transmit the home screen display instruction input according to the manipulation of the manipulation unit 23 of the player, to the server 3 through the terminal communication unit 21 (Step S101).

Next, the server transmitting/receiving unit 331 of the server 3 may receive the home screen display instruction from the mobile terminal 2 through the server communication unit 31. Next, the screen creation unit 333 may execute the home screen creation processing on the basis of the home screen display instruction received by the server transmitting/receiving unit 331 (Step S102). Furthermore, the details of the home screen creation processing will be described below.

Next, the server transmitting/receiving unit 331 may transmit the home screen display data created by the home screen creation processing to the mobile terminal 2 through the server communication unit 31 (Step S103). The home screen display data may be display data for displaying any one of the first home screen 400, the second home screen 420, the third home screen 500, and the fourth home screen 510.

Next, the terminal transmitting/receiving unit 251 of the mobile terminal 2 may receive the home screen display data from the server 3 through the terminal communication unit 21. Then, the display processing unit 252 may display any one of the first home screen 400, the second home screen 420, the third home screen 500, and the fourth home screen 510, on the display unit 24, on the basis of the home screen display data received by the terminal transmitting/receiving unit 251 (Step S104).

The display processing unit 252 may acquire various instructions input by the player's manipulation of the manipulation unit 23, in any one of the first home screen 400, the second home screen 420, the third home screen 500, and the fourth home screen 510, displayed on the display unit 24.

Next, in a case where various instructions may be input according to the manipulation of the manipulation unit of the player, the display processing unit 252 may acquire the input various instructions. Next, the terminal transmitting/receiving unit 251 may transmit the various instructions acquired by the display processing unit 252, to the server 3 through the terminal communication unit 21, along with the player ID (Step S105).

Next, the server transmitting/receiving unit 331 of the server 3 may receive the various instructions from the mobile terminal 2 through the server communication unit 31. Next, the screen creation unit 333, the content selection unit 334, the addition unit 335, and the content processing unit 336 may execute the game progress processing, on the basis of the various instructions received by the server transmitting/receiving unit 331 (Step S106).

Next, the server transmitting/receiving unit 331 may transmit various display data items for displaying various screens created by the game progress processing, to the mobile terminal 2 through the server communication unit 31 (Step S107).

Next, the terminal transmitting/receiving unit 251 of the mobile terminal 2 may receive the various display data items from the server 3 through the terminal communication unit 21. Then, the display processing unit 252 may display the various screens on the display unit 24, on the basis of the various display data items received by the terminal transmitting/receiving unit 251 (Step S108).

Hereinafter, in the screen displayed on the display unit 24, Step S105 to Step S108 may be executed again whenever the various instructions according to the manipulation of the manipulation unit 23 of the player are input.

Figure 10:
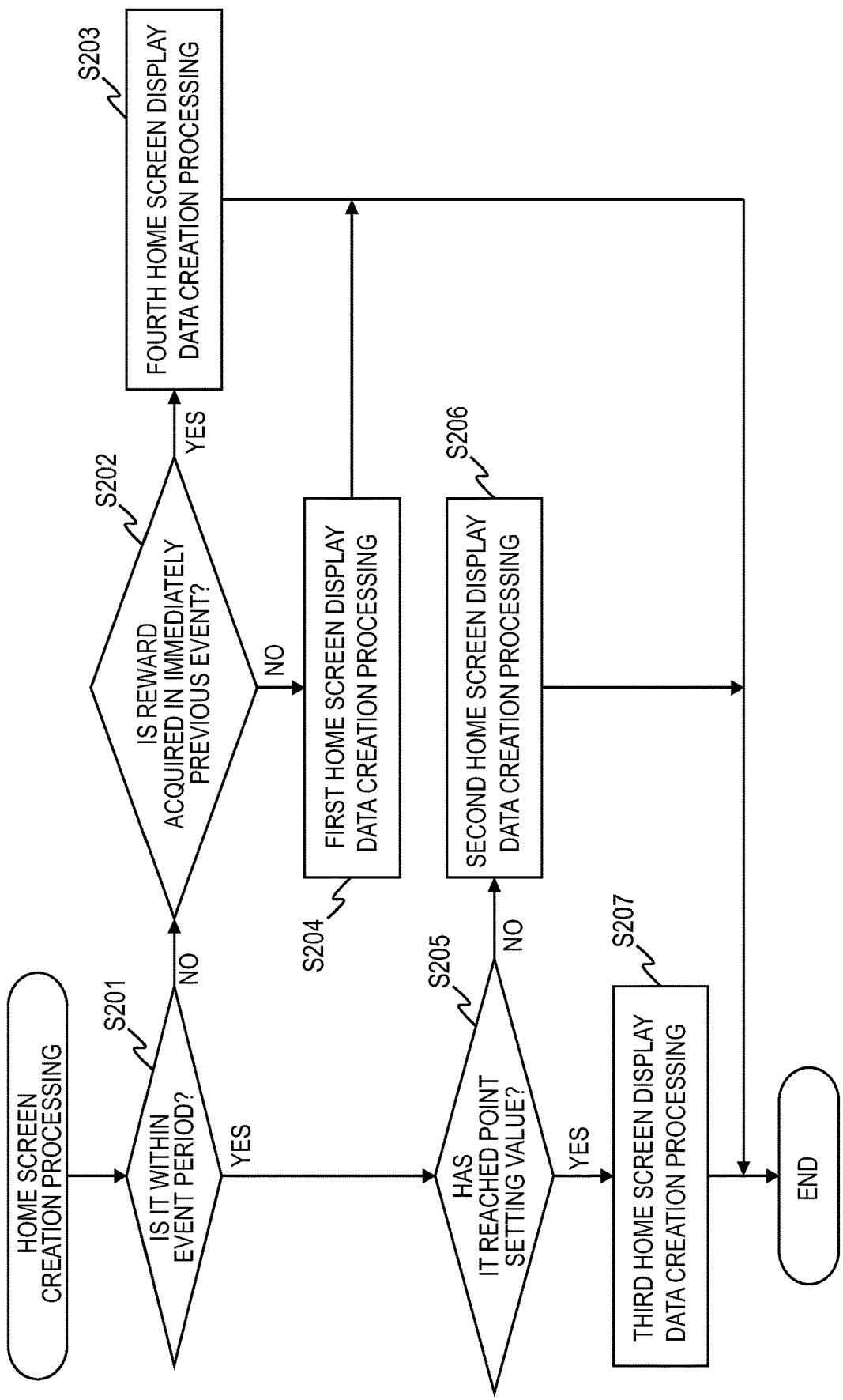
FIG. 10 may be a diagram illustrating an exemplary embodiment of an operation flow of home screen display processing.

FIG. 10 may be a diagram illustrating an example of an operation flow of the home screen creation processing of the progress processing unit 332 and the screen creation unit 333 of the server 3. The home screen creation processing illustrated in FIG. 10, may be executed in Step S102 of FIG. 9. In addition, the home screen creation processing illustrated in FIG. 10, may be executed in Step S306 of FIG. 11 described below.

Initially, the progress processing unit 332 may determine whether or not the date and time when the server transmitting/receiving unit 331 had acquired the home screen display instruction is within the event period (Step S201).

In a case where it is determined that the date and time when the server transmitting/receiving unit 331 has acquired the home screen display instruction, is out of the event period (Step S201-No), the progress processing unit 332 may determine whether or not the player may acquire the reward in the event ended just before (Step S202). Furthermore, the reward in the event may be the second game content.

In a case where the progress processing unit 332 determines that the player may acquire a reward in the event ended just before (Step S202—Yes), the screen creation unit 333 may create the display data for displaying the fourth home screen 510 (Step S203). In a case where Step S203 is ended, a set of steps may be ended.

In a case where the progress processing unit 332 determines that the player does not acquire the reward in the event ended just before (Step S202—No), the screen creation unit 333 may create the display data for displaying the first home screen 400 (Step S204). In a case where Step S204 is ended, a set of steps may be ended.

In a case where it is determined that the date and time when the server transmitting/receiving unit 331 has acquired the home screen display instruction, may be within the event period (Step S201—Yes), the progress processing unit 332 may determine whether or not the point value of the group to which the player belongs, has reached the point setting value (Step S205).

In a case where the progress processing unit 332 determines that the point value of the group to which the player belongs, has not reached the point setting value (Step S205—No), the screen creation unit 333 may create the display data for displaying the second home screen 420 (Step S206). In a case where Step S206 is ended, a set of steps may be ended.

In a case where the progress processing unit 332 determines that the point value of the group to which the player belongs, reaches the point setting value (Step S205—Yes), the screen creation unit 333 may create the display data for displaying the third home screen 500 (Step S207). In a case where Step S207 is ended, a set of steps may be ended.

Figure 11:
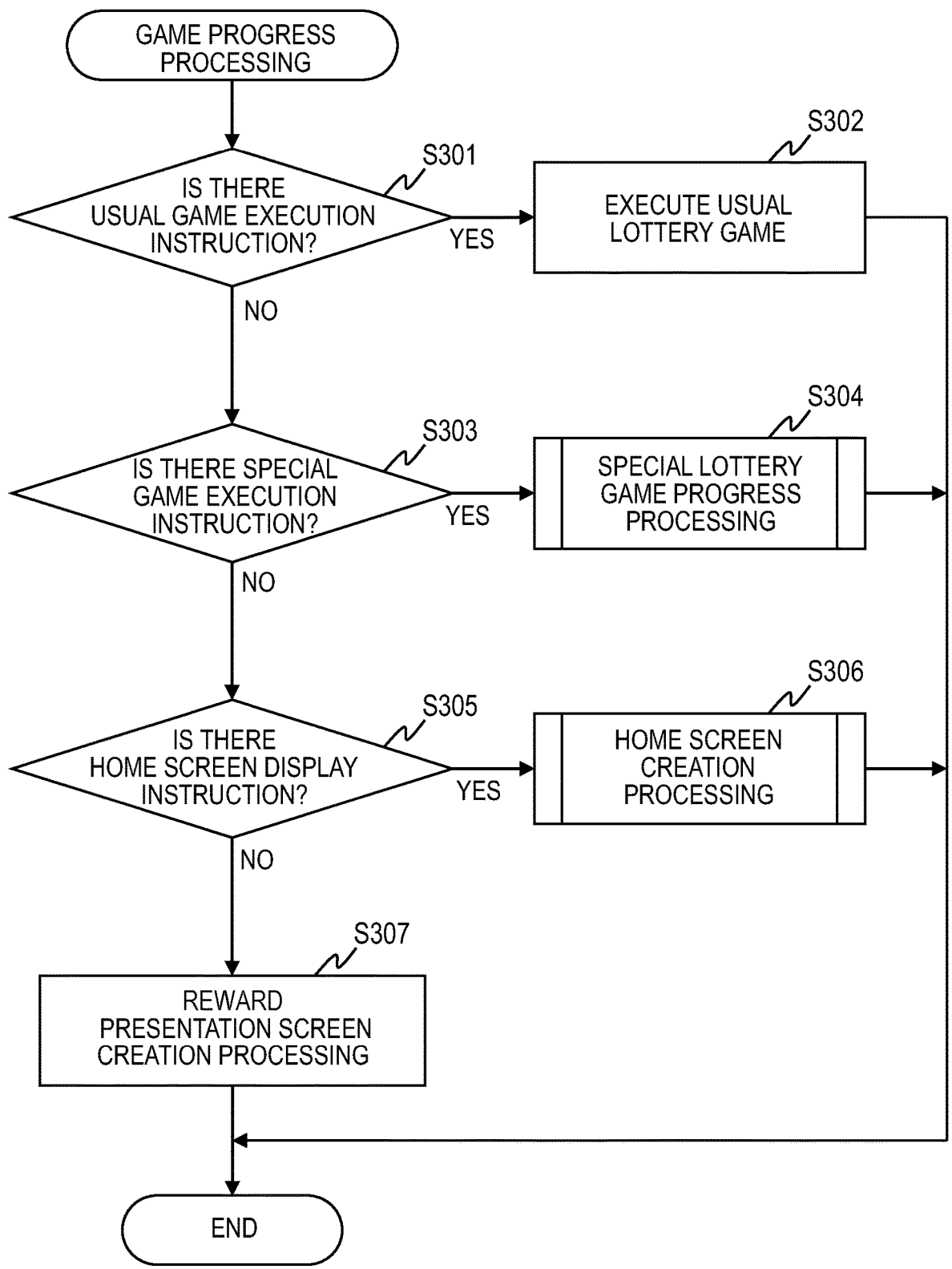
FIG. 11 may be a diagram illustrating an exemplary embodiment of an operation flow of game progress processing.

FIG. 11 may be a diagram illustrating an example of an operation flow of the game progress processing of the progress processing unit 332, the screen creation unit 333, the content selection unit 334, the addition unit 335, and the content processing unit 336 of the server 3. The game progress processing illustrated in FIG. 11, may be executed in Step S106 of FIG. 9.

Initially, the progress processing unit 332 may determine whether or not the instruction acquired by the server transmitting/receiving unit 331 is the usual game execution instruction (Step S301).

In a case where the progress processing unit 332 determines that the instruction acquired by the server transmitting/receiving unit 331 is the usual game execution instruction (Step S301—Yes), the content selection unit 334 may execute the usual lottery game (Step S302). In a case where Step S302 is ended, a set of steps may be ended.

In a case where it is determined that the instruction retrieved by the server transmitting/receiving unit 331 is not the usual game execution instruction (Step S301—No), the progress processing unit 332 may determine whether or not instruction the acquired by the server transmitting/receiving unit 331 is the special game execution instruction (Step S303).

In a case where the progress processing unit 332 determines that the instruction retrieved by the server transmitting/receiving unit 331 is the special game execution instruction (Step S303—Yes), the screen creation unit 333, the content selection unit 334, and the addition unit 335 may execute special lottery game progress processing (Step S304). In a case where Step S304 is ended, a set of steps may be ended. Furthermore, in a case where the date and time when the server transmitting/receiving unit 331 has acquired the special game execution instruction are out of the event period, the screen creation unit 333, the content selection unit 334, and the addition unit 335 may not execute the special lottery game progress processing, and a set of steps may be ended.

In a case where it is determined that the instruction retrieved by the server transmitting/receiving unit 331 is not the special game execution instruction (Step S303—No), the progress processing unit 332 may determine whether or not the instruction retrieved by the server transmitting/receiving unit 331 is the home screen display instruction (Step S305).

In a case where the progress processing unit 332 determines that the instruction retrieved by the server transmitting/receiving unit 331 is the home screen display instruction (Step S305—Yes), the screen creation unit 333 may execute the home screen creation processing (Step S306). In a case where Step S306 is ended, a set of steps may be ended.

In a case where the progress processing unit 332 determines that the instruction retrieved by the server transmitting/receiving unit 331 is not the home screen display instruction (that is, the reward display instruction) (Step S305—No), the screen creation unit 333 and the content processing unit 336 may execute reward presentation screen creation processing (Step S307). In a case where Step S307 is ended, a set of steps may be ended.

Figure 12:
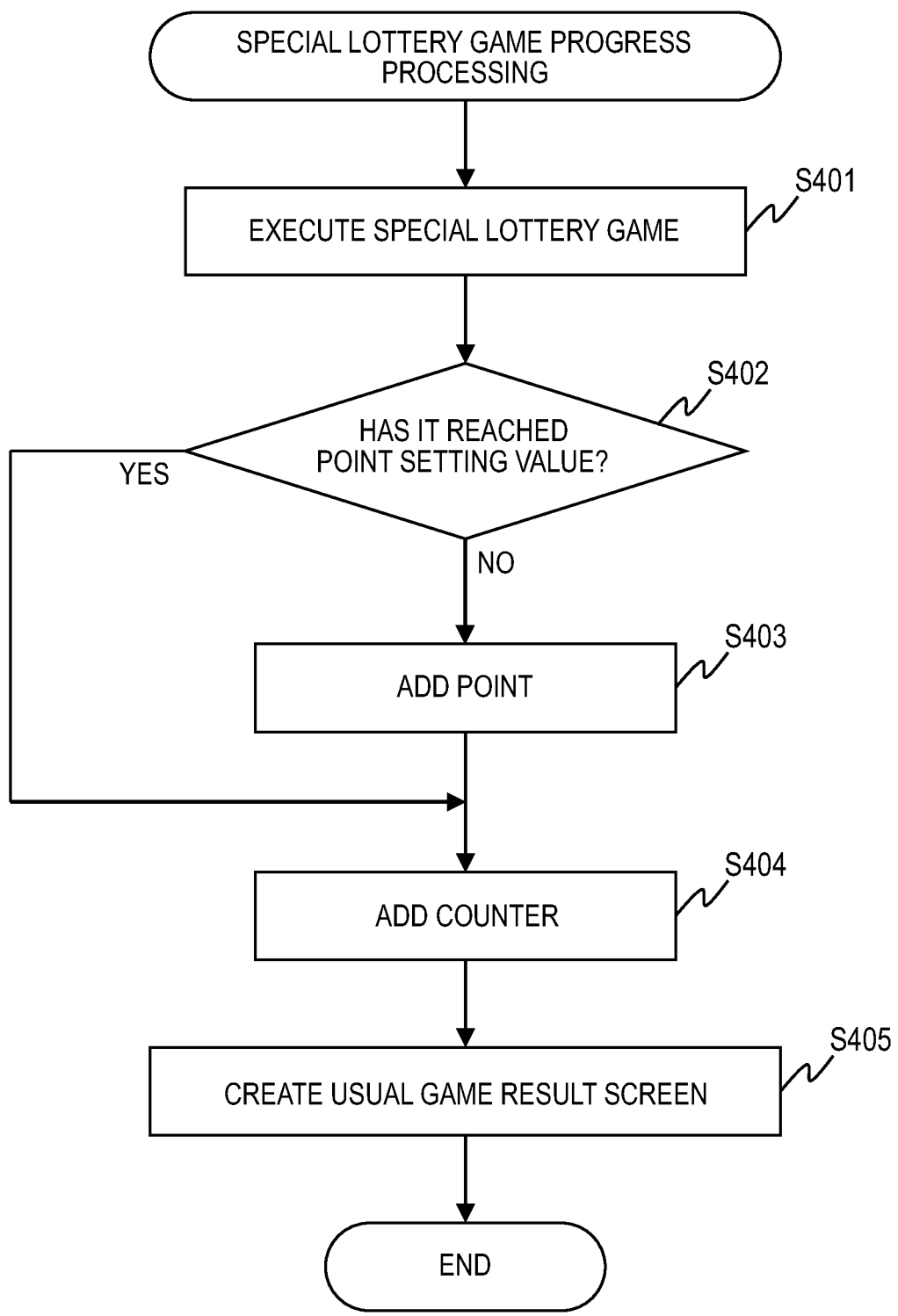
FIG. 12 may be a diagram illustrating an exemplary embodiment of an operation flow of special lottery game progress processing.

FIG. 12 may be a diagram illustrating an example of an operation flow of the special lottery game progress processing of the screen creation unit 333, the content selection unit 334, and the addition unit 335 of the server 3. The special lottery game progress processing illustrated in FIG. 12, may be executed in Step S304 of FIG. 11.

Initially, the content selection unit 334 may execute the special lottery game (Step S401).

Next, the addition unit 335 may determine whether or not the point value of the group to which the player belongs, reaches the point value setting value (Step S402).

In a case where it is determined that the point value of the group to which the player belongs, has not reached the point setting value (Step S402—No), the addition unit 335 may increase the point value (Step S403). Next, the addition unit 335 may increase the counter (Step S404). Then, the screen creation unit 333 may create the display data for displaying the special game result screen 430 (Step S405), and a set of steps may be ended.

In a case where it is determined that the point value of the group to which the player belongs, reaches the point setting value (Step S402—Yes), the addition unit 335 may increase the counter (Step S404). That is, even after the point value of the group, to which the player belongs, reaches the point setting value, each of the players participates in the special lottery game, and thus, it may be possible to increase the counter of each of the players. For this reason, the player may be capable of performing the special lottery game in order to acquire a second game content with a higher value, after it may be determined that the second game content may be provided to the player. Then, the screen creation unit 333 may create the display data for displaying the special game result screen 430 (Step S405), and a set of steps may be ended.

As described above, in the game system 1, each of the plurality of players may execute the game using the first game content as the possession target, and the second game content according to the contribution ratio with respect to the game (for example, the number of times of execution or the like) may be provided to the plurality of players. The second game content may be provided in a case where the point value, which may increase whenever the game is executed by each of the plurality of players, reaches the point setting value. According to such a game system, not only may the game using the first game content as the possession target be provided, but also the plurality of players may execute the game in cooperation, and thus, the plurality of players may be capable of acquiring the second game content. Thus, in the game system, it may be possible to improve the motivation of the plurality of players for participating in the game, and to increase the number of participating players with respect to the game.

Furthermore, the invention may not be limited to this embodiment. For example, the addition unit 335 may determine the additional point value according to the result of the special lottery game, and may execute processing of adding the determined additional point value to the point value associated with the group to which the player belongs. In this case, in a case where the first game content, which may be associated with the player by the special lottery game, has a specific parameter, the addition unit 335 may randomly determine the additional point value, and may add the determined additional point value to the point value associated with the group to which the player belongs. Furthermore, the parameter may be an attribute or the like. For example, in a case where the first game content acquired by the player in the special lottery game, may have a specific attribute (for example, a "fire" attribute, a "water" attribute, and the like), the processing of increasing the point value may be executed.

In addition, the addition unit 335 may associate the second game content having a value lower than that of the second game content corresponding to the value of the counter of the player with the player initially executing the special game content, after the point value reaches the point setting value. Accordingly, the second game content, with a lower value than usual, may be given to the player who started the special game after it is decided whether to grant the second game content. Therefore, a higher reward can be provided to the player contributing to an increase in the point value than the player not contributing to the increase in the point, early participation with respect to the special lottery game can be accelerated.

Alternatively, the addition unit 335 may associate the second game content having a value higher than that of the second game content corresponding to the value of the counter of the player with the player initially executing the special game content, after the point value reaches the point value setting. Accordingly, the player initially starting the special game content, may acquire the second game content having a value higher than usual, after it may be determined that the second game content can be retrieved. Therefore, it may be possible to accelerate the participation of the player having low motivation with respect to the special lottery game.

Furthermore, each function of the server processing unit 33 described above, may be executed by the terminal processing unit 25 of the mobile terminal 2. In this case, in a case where various tables are stored in the terminal storage unit 22, it may not be necessary to perform the communication with respect to the server 3 in each processing, and the function described above can be realized by only the mobile terminal 2. In addition, the game to be executed in the mobile terminal 2, may be a hybrid game in which each of the server 3 and the mobile terminal 2 takes a part of the processing. In this case, for example, each of the game screens according to the progress of the game may be set to a web display which may be displayed on the mobile terminal 2 on the basis of the display data generated by the server 3, and the other menu screen or the like may be set to a native display which may be displayed by a native application installed in the mobile terminal 2.

In addition, the game system 1 may only include the plurality of mobile terminals 2 which may be manipulated by the plurality of players, respectively. Each of the plurality of mobile terminals 2 may perform wireless communication according to a wireless communication system using the IEEE802.11 standard, with respect to the other mobile terminal 2, and an ad hoc network may be configured by the plurality of mobile terminals 2. In this case, a specific mobile terminal 2 in the plurality of mobile terminals 2 may function as a host, and may execute each function of the server 3 described above. The mobile terminal 2 other than the specific mobile terminal 2, in the plurality of mobile terminals 2, may perform communication with respect to the specific mobile terminal 2 executing each function of the server 3, and thus, the game described above may be executed. Furthermore, the specific mobile terminal 2 functioning as the host, may execute both may function of each function of the server 3 and each function of the mobile terminal 2.

A person skilled in the art should appreciate that various changes, substitutions, and modifications can be added without departing from the spirit and the scope of the invention.

The invention claimed is:

1. A non-transitory computer readable recording medium having stored thereon instructions to be executed on a computer, the instructions causing the computer to perform the steps of:
    checking, with a processing unit of the computer, based on information retrieved from a transmitting/receiving unit of the computer, an event state that is adjustable between an active state and an inactive state, and determining, with the processing unit, whether the event state is in the active state or the inactive state;
    wherein, in a case where the event state is determined to be in the active state, the computer is caused to perform a step of causing a gauge object to be displayed on a user interface of a communication terminal, and wherein, in a case where the event state is determined to be in the inactive state, the computer is caused to perform a step of causing the gauge object not to be displayed on the user interface;
    storing a plurality of first items of game content, one or more second items of game content different from the first items of game content, a point value associated with a group, said group including a plurality of players, and a counter associated with each of the plurality of players in a storage unit;
    selecting a predetermined number of first items of game content from the first items of game content stored in the storage unit, according to a selection instruction from a player in the plurality of players included in the group, by a predetermined selection method, said player comprising a selecting player;
    storing the selected predetermined number of first items of game content in the storage unit, as a possession target of the selecting player;
    incrementing the counter associated with the selecting player, and adding an additional point value to the point value associated with the group;
    causing a first information relevant to the point value associated with the group to be displayed on the user interface;
    upon adding the additional point value to the point value associated with the group, updating the first information and causing the gauge object displayed on the user interface to be updated; and
    terminating a predetermined event period and setting the event state to be an inactive state, and in a case where the point value associated with the group reaches the predetermined value, determining, according to a value of the counter for each player in the plurality of players included in the group, a second item of game content in the one or more second items of game content to be stored in association with each player, and storing said second item of game content in association with each player.

2. The non-transitory computer-readable medium according to claim 1,
    wherein determining the second item in the one or more second items of game content to be stored in association with each player comprises determining the second item from a plurality of second items of game content, wherein the selected second item of game content is stored in the storage unit, in association with each player.

3. The non-transitory computer-readable medium according to claim 2,
    wherein the additional point value is a value which is randomly selected within a predetermined numerical range.

4. The non-transitory computer-readable medium according to claim 2,
    wherein, only in a case in which the point value reaches the predetermined value, the second item of game content is stored in the storage unit, in association with each player.

5. The non-transitory computer-readable medium according to claim 4,
    wherein the additional point value is a value which is randomly selected within a predetermined numerical range.

6. The non-transitory computer-readable medium according to claim 2,
    wherein, in a case in which the point value does not reach the predetermined value, only the first item of game content is stored in the storage unit, in association with each player.

7. The non-transitory computer-readable medium according to claim 6,
    wherein the additional point value is a value which is randomly selected within a predetermined numerical range.

8. The non-transitory computer-readable medium according to claim 7,
    wherein information relevant to the counter associated with the player is displayed.

9. The non-transitory computer-readable medium according to claim 8,
    wherein the second game content associated with each of the players increases in value to a high value as the counter increases.

10. The non-transitory computer-readable medium according to claim 9,
    wherein the computer is configured to receive the selection instruction until a predetermined game period is ended,
    when the point value associated with the group reaches the predetermined value before the predetermined game period is ended, continuing processing of storing the predetermined number of first items of game content selected according to the selection instruction in the storage unit, as the possession target of the player, and continuing processing of incrementing the counter associated with the selecting player, and
    when the predetermined game period is ended, the second item of game content according to the counter associated with each of the players is stored in the storage unit, in association with each of the players, with respect to each of the plurality of players included in the group.

11. The non-transitory computer-readable medium according to claim 1, wherein the additional point value is a value which is randomly selected within a predetermined numerical range.

12. The non-transitory computer-readable medium according to claim 11,
wherein information relevant to the counter associated with the player is displayed.

13. The non-transitory computer-readable medium according to claim 1,
wherein information relevant to the counter associated with the player is displayed.

14. The non-transitory computer-readable medium according to claim 13,
wherein the second game content associated with each of the players increases in value to a high value as the counter increases.

15. The non-transitory computer-readable medium according to claim 1,
wherein the second game content associated with each of the players increases in value to a high value as the counter increases.

16. The non-transitory computer-readable medium according to claim 15,
wherein the computer is configured to receive the selection instruction until a predetermined game period is ended,
when the point value associated with the group reaches the predetermined value before the predetermined game period is ended, continuing processing of storing the predetermined number of first items of game content selected according to the selection instruction in the storage unit, as the possession target of the player, and continuing processing of incrementing the counter associated with the selecting player, and
when the predetermined game period is ended, the second item of game content according to the counter associated with each of the players is stored in the storage unit, in association with each of the players, with respect to each of the plurality of players included in the group.

17. The non-transitory computer-readable medium according to claim 1,
wherein the computer is configured to receive the selection instruction until a predetermined game period is ended,
when the point value associated with the group reaches the predetermined value before the predetermined game period is ended, continuing processing of storing the predetermined number of first items of game content selected according to the selection instruction in the storage unit, as the possession target of the player, and continuing processing of incrementing the counter associated with the selecting player, and
when the predetermined game period is ended, the second item of game content according to the counter associated with each of the players is stored in the storage unit, in association with each of the players, with respect to each of the plurality of players included in the group.

18. A control method of a computer including a storage unit, the method comprising:
checking, with a processing unit of the computer, based on information retrieved from a transmitting/receiving unit of the computer, an event state that is adjustable between an active state and an inactive state, and determining, with the processing unit, whether the event state is in the active state or the inactive state;
wherein, in a case where the event state is determined to be in the active state, the computer is caused to perform a step of causing a gauge object to be displayed on a user interface of a communication terminal, and wherein, in a case where the event state is determined to be in the inactive state, the computer is caused to perform a step of causing the gauge object not to be displayed on the user interface;
storing a plurality of first items of game content, a plurality of second items of game content different from the first items of game content, a point value associated with a group, said group including a plurality of players, and a counter associated with each of the plurality of players in a storage unit;
selecting a predetermined number of first items of game content from the first items of game content stored in the storage unit, according to a selection instruction from a player in the plurality of players included in the group, by a predetermined selection method, said player comprising a selecting player;
storing the selected predetermined number of first items of game content in the storage unit, as a possession target of the selecting player;
incrementing the counter associated with the selecting player, and adding an additional point value to the point value associated with the group;
causing a first information relevant to the point value associated with the group to be displayed on the user interface;
upon adding the additional point value to the point value associated with the group, updating the first information and causing the gauge object displayed on the user interface to be updated; and
terminating a predetermined event period and setting the event state to be an inactive state, and in a case where the point value associated with the group reaches the predetermined value, determining, according to a value of the counter for each player in the plurality of players included in the group, a second item of game content in the one or more second items of game content to be stored in association with each player, and storing said second item of game content in association with each player.

19. A computer comprising:
a processing unit comprising a selection unit, an addition unit, a display unit, and a content processing unit;
a transmitting/receiving unit configured to receive information related to an event state adjustable between an active state and an inactive state, wherein the processing unit is configured to check the event state and determine whether the event state is in the active state or the inactive state, wherein the processing unit is further configured to, in a case where the event state is determined to be in the active state, perform a step of causing a gauge object to be displayed on a user interface of a communication terminal, and wherein the processing unit is further configured to, in a case where the event state is determined to be in the inactive state, perform a step of causing the gauge object not to be displayed on the user interface of the communication terminal;
a storage unit storing a plurality of first items of game content, a plurality of second items of game content different from the first items of game content, a point value associated with a group, said group including a plurality of players, and a counter associated with each of the plurality of players;

a selection unit selecting a predetermined number of first items of game content from the first items of game content stored in the storage unit, according to a selection instruction from a player in the plurality of players included in the group, by a predetermined selection method, said player comprising a selecting player, and storing the selected predetermined number of first items of game content in the storage unit, as a possession target of the selecting player;

an addition unit incrementing the counter associated with the selecting player, and adding an additional point value to the point value associated with the group;

a display unit causing a first information relevant to the point value associated with the group to be displayed on the user interface, the display unit further, upon the addition unit adding the additional point value to the point value associated with the group, updating the first information and causing the gauge object displayed on the user interface to be updated; and a content processing unit, the content processing unit configured to terminate a predetermined event period and set the event state to be an inactive state and, in a case where the point value associated with the group reaches the predetermined value, determining, according to a value of the counter for each player in the plurality of players included in the group, a second item of game content in the plurality of second items of game content to be stored in association with each player, and storing said second item of game content in association with said player.

* * * * *